United States Patent [19]

Okamoto

[11] Patent Number: 5,754,531
[45] Date of Patent: May 19, 1998

[54] COMMUNICATION CONTROL METHOD AND COMMUNICATION APPARATUS

[75] Inventor: Yasushi Okamoto, Tokyo, Japan

[73] Assignee: Mitsubishi Denki Kabushiki Kaisha, Tokyo, Japan

[21] Appl. No.: 558,216

[22] Filed: Nov. 17, 1995

[30] Foreign Application Priority Data

Jun. 15, 1992 [JP] Japan ................. 7-149072

[51] Int. Cl.$^6$ ................. H04J 3/16; H04L 1/14
[52] U.S. Cl. ................. 370/249; 370/402; 370/447; 371/34
[58] Field of Search ................. 370/242, 245, 370/249, 389, 392, 393, 394, 400, 401, 402, 410, 423, 424, 445, 447, 449, 451, 461, 462; 340/825.05, 825.5, 825.51, 825.52; 371/32, 33, 34, 37.1; 375/224

[56] References Cited

U.S. PATENT DOCUMENTS

| | | | |
|---|---|---|---|
| 4,351,059 | 9/1982 | Gregoire et al. | 375/224 |
| 4,546,467 | 10/1985 | Yamamoto | 370/245 |
| 4,558,428 | 12/1985 | Matsumura et al. | 370/249 |
| 5,289,474 | 2/1994 | Purcell et al. | 370/249 |
| 5,357,525 | 10/1994 | Moriue et al. | 371/32 |
| 5,457,701 | 10/1995 | Wasilewski et al. | 371/37.1 |

FOREIGN PATENT DOCUMENTS

| | | |
|---|---|---|
| 63-131632 | 6/1988 | Japan. |
| 3276934 | 12/1991 | Japan. |
| 5102988 | 4/1993 | Japan. |
| 750654 | 2/1995 | Japan. |

OTHER PUBLICATIONS

"Road vehicles—Low speed serial data communication—Part 3: Class B data communication network interface (J 1850)", Draft International Standard ISO/DIS 11519–3, pp. 12–17.

Primary Examiner—Alpus H. Hsu
Attorney, Agent, or Firm—Leydig, Voit & Mayer, Ltd.

[57] ABSTRACT

A communication control apparatus achieves accurate and efficient detection of errors in transmitted control data. Control data is transmitted from a first node to a second node. If the second node determines that the data is free from errors, the second node returns the data to the first node. The first node compares the returned data to the originally transmitted data. If the data matches the originally transmitted data, the first node sends an acknowledge signal to the second node. If the returned data does not match, the first node transmits an error signal to the second node. In this manner, the first node detects data errors even when error checking at the second node fails.

16 Claims, 29 Drawing Sheets

RETURN DATA SEQUENCE

NODE B   000000000000

NODE C   000011000000

NODE D   000000100000

NODE E   000000000110

---

BUS LINE 000011100110

FIG. 10

COMMUNICATION CONTROL METHOD AND COMMUNICATION APPARATUS

BACKGROUND OF THE INVENTION

1. Field of the Invention

The present invention relates to a communication control method and an apparatus thereof, particularly, it relates to a communication control method and an apparatus, which returns reception signal itself to a transmitting-side node, in case that no errors are found in the reception signal.

2. Description of the Prior Art

FIG. 24 shows an example of a LAN (local area network) system using a conventional communication control apparatus. A LAN system using the conventional communication control apparatus is explained using FIG. 24. In FIG. 24, five nodes (A, B, C, D, E) are connected to a bus line 10 of the LAN system. Node A comprises a communication control apparatus 1000, an external control apparatus 13, and a control system 29. The other nodes (B, C, D, E), in the same way, comprise a communication control apparatus, an external control apparatus and a control system.

FIG. 25 shows an example of a conventional communication frame format. This communication frame format comprises a start of communication signal 1 which indicates start of communication, a destination address 2 which indicates destination to transmit, a self address 3 which indicates an origin of transmission, a transmission data sequence 4 which indicates a data area to transmit, an end of transmission data signal 5 which indicates termination of transmission data, an ACK/NACK signal 66 which returns a signal from the receiving-side to the transmitting-side as to whether transmission error is detected at the receiving-side, and an end of communication signal 7 which indicates termination of communication frame. Area 8 comprises a plurality of signals transmitted from the transmitting-side to the receiving-side, and area 9 comprises a signal transmitted from the receiving-side to the transmitting-side. In the past, regarding this ACK/NACK signal 66, a self address assigned to a self node is returned to the transmitting-side as an ACK signal, but not returned to the transmitting-side as NACK signal when the receiving-side does not receive the signal from the transmitting-side. Further, there is another system where only 1 bit is returned such as "1" in case of acknowledge (no error), and "0" in case of non-acknowledge (with error) as ACK/NACK signal 66.

The communication method using this communication frame format is explained using FIG. 25 and FIG. 27. FIG. 27 shows a schematic diagram of a conventional communication control apparatus 1000. In FIG. 27, a control system 29 comprises physical systems for opening and closing windows, controlling engine and driving wipers, and so on when this system is applied to cars, for example. The control system 29 comprises a system which controls physical systems. An external control apparatus 13 comprises CPU and so on, which processes a control signal generated at the control system 29, and generates a control signals to drive the control system 29. A communication control apparatus 1000 performs communication between a CPU and a CPU connected to another node.

The external control apparatus 13 is connected to an external control apparatus interface portion 1006 in the communication control apparatus 1000 via line 13a. In case the transmission demand "Drive the wiper" for example, is requested from the control system 29, the external control apparatus 13 sends a transmission demand to the external control apparatus interface portion 1006 via the line 13a, and transfers transmission data such as "Drive the wiper" for example, to the communication control apparatus 1000. The transferred transmission data are written in the transmission buffer register 103 via the external control apparatus interface portion 1006 and a line 1009. The written transmission data are inputted into a transmission control portion 1001 via a line 1010. The transmission control portion 1001 assembles this transmission data to a communication frame, and sends it to a bus line 10 as a transmission signal 1014 via a driver 11.

The reception operation is explained below. The reception signal 1015 such as "Drive the wiper", for example, which is received from a receiver 12 of another node connected to the bus line is inputted into a reception control portion 1002. The reception control portion 1002 compares a destination address 2 in the communication frame format of the reception signal with a self address data written in advance in a self address register 1005 by the external control apparatus 13. If the comparison result is matched the state moves to a reception process.

The reception control portion 1002 writes the reception data into a reception buffer register 1004 via a line 1011. The reception control portion 1002 gives instructions to the transmission control portion 1001 via the line 1024 so that the transmission control portion 1001 sends a return data sequence in case that the reception control portion 1002 does not detect any reception errors. The transmission control portion 1001 assembles the data, which is stored in the self address register 1005 connected via a line 1008, to a return data sequence, and returns it to the transmission node. The reception data in which any errors are not detected in the reception buffer register 1004 is read out into the external control apparatus 13 via the external control apparatus interface portion 1006 which is connected to the reception buffer register 1004 via a line 1012.

FIG. 26 shows another example of the conventional communication frame format. This frame format comprises start of communication signal 1 which indicates start of communication, broadcast code signal 67 which shows that data are transmitted simultaneously to a plurality of nodes connected to bus line, a self address 3 which indicates an origin of transmission, a transmission data sequence 4 which indicates a data area to transmit, an end of transmission data signal 5 which indicates termination of transmission data, an ACK/NACK signal 68 which returns a signal from the receiving-side to the transmitting-side as to whether transmission error is detected at the receiving-side, and an end of communication signal 7 which indicates termination of communication frame. Area 8 comprises a plurality of signals transmitted from the transmitting-side to the receiving-side, and area 9 comprises a signal transmitted from the receiving-side to the transmitting-side. In this example, all slave nodes (B, C, D, E) receive and process the communication frame which is transmitted from the master node A.

ACK/NACK signal sequence 68 is divided into areas of 68b, 68c, 68d, 68e, and data in these area are ACK/NACK signals corresponding to nodes B, C, D, E, respectively. The receiving-side returns the self address assigned to each node as the acknowledge signal via the areas 68b~68d in case that no errors can be found, and does not return the acknowledge signal in case that errors are found. Further, there is another system where only 1 bit is returned such as "1" in case of acknowledge (no error), and "0" in case of non-acknowledge (with error).

FIG. 28 shows another example of a LAN system which uses the conventional communication control apparatus.

FIG. 29 shows another construction of a conventional communication control apparatus 1100. Five nodes (A, B, C, D, E) are connected to the bus line 10 of LAN system in FIG. 28. Nodes A, B, C comprise a communication control apparatus 1000, an external control apparatus 13, an control system 29. The other nodes D and E comprise a control system 1200 and a communication control apparatus 1100, but do not comprise an external control apparatus 13.

In FIG. 28, the communication method using the communication frame format of FIG. 25 is explained using FIG. 25 and FIG. 29. For example, where the data are transmitted from node A to node D of FIG. 28, is explained below. The operation of the transmitting-side is omitted since it is the same as is explained in FIG. 27.

The reception operation is explained below. A reception signal 1215 such as "Drive the wiper", for example, which is received from a receiver 12 connected to the bus line 10, is inputted into a reception control portion 1202. The reception control portion 1202 compares a destination address 2 of the reception signal with a self address data set in advance in a self address register 1205. If the comparison result is matched the state moves to a reception process. The reception control portion 1202 writes the reception data into a reception buffer register 1204 via a line 1211.

The reception control portion 1202 gives instructions to the transmission control portion 1201 via the line 1224 so that the transmission control portion 1201 sends a return data sequence in case that the reception control portion 1202 does not detect any reception errors.

The transmission control portion 1201 assembles the data, which is stored in the self address register 1205 connected via a line 1208, to a return data sequence, and returns it to the transmission node. The reception data, in which any errors are not detected in the reception buffer register 1204, drives outputs 1206c and 1206d of an external control apparatus 13 via a control system interface portion 1206 which is connected to the reception buffer register 1204 via a line 1212.

However, in the communication control apparatus using the conventional frame format shown in FIG. 25 and FIG. 26, in case that the error detecting function of receiving-side communication control apparatus is out of order, the receiving-side communication control apparatus judges the communication frame which basically includes errors to be normal reception. In this case, the receiving-side returns an ACK signal to the transmitting-side, and then the transmitting-side judges that the receiving-side could have received normally. This results in malfunction for the whole system.

Besides, it has been impossible to avoid malfunction, since it is impossible to check the whole, even if the receiving-side external control apparatus (mainly micro computer) has a program to check the malfunctional receiving data which basically might not be received, and so on.

Further, even if the check program detects malfunctions, it is needed to assemble the communication frame again, and then transmit the fact that the preceding communication has not been received normally, which complicates the control program. Further, transmission efficiency decreases, because other data are transmitted than the data which should basically be communicated to the bus line.

Further, in case of the nodes D, E etc. which have no external control apparatus shown in FIG. 28, they do not have a CPU which runs the check program. Therefore, the communication control apparatus becomes complicated and expensive if this kind of check is carried out using hardware.

SUMMARY OF THE INVENTION

It is an object of the present invention to provides a communication control method and a communication apparatus to solve the problems mentioned above.

It is another object of the present invention to provide a communication control method and a communication apparatus in which a transmitting side node is able to check the data which are received at a receiving-side node and also able to confirm the break down of the error detection facility in the receiving-side nodes, which improves reliability of the total communication system.

It is further object of the present invention to provide a communication control method and a communication apparatus in which a transmitting side node is able to check the data by comparing the data which are transmitted from the transmitting side with data which are received from the receiving-side node, which improves reliability of the total communication system.

It is further object of the present invention to provide a communication control method and a communication apparatus where no external control apparatus is needed at a slave node side, which decreases total system cost.

It is further object of the present invention to provide a communication control method and a communication apparatus where the receiving-side slave nodes return inverted data if upon detecting some errors in the received communication frame, thereby the transmitting-side master node knows that the receiving-side node has detected errors, which makes the slave node side apparatus simple and decreases total system cost.

It is further object of the present invention to provide a communication control method and a communication apparatus where transmitting-side master node knows that the receiving-side slave nodes have detected some errors from the identification bit which are returned from the receiving-side slave nodes, which makes the slave node side apparatus simple and decreases total system cost.

It is further object of the present invention to provide a communication control method and a communication apparatus where the transmitting frame comprises effective /non-effective areas which is used for sending data only needed, which decrease the chance to send the transmission frame, which improves efficiency of the total communication system.

According to one aspect of the invention, a communication control method in which a plurality of nodes having a communication control apparatus are connected to a bus line, and data are transmitted and received between respective communication control apparatuses comprising the steps of: transmitting-side node transmits a communication frame comprising a transmission data sequence (4); receiving-side node encodes a received communication frame, stores it as a reception data, and when detecting no errors in the communication frame, the receiving-side node returns the reception data as it is, which correspond to the transmission data sequence (4) in the stored reception data, to the transmitting-side node as a return data sequence (acknowledge signal) (6).

According to another aspect of the invention, a communication control method in which a plurality of nodes having a communication control apparatus are connected to a bus line, and data are transmitted and received between respective communication control apparatuses comprising the steps of: transmitting-side node transmits a communication frame comprising a transmission data sequence (4);

receiving-side node decodes the received communication frame, stores it as a reception data, and when detecting no errors in the communication frame, returns the reception data as it is, which correspond to the transmission data sequence (4) in the stored reception data, to the transmitting-side node as a return data sequence (acknowledge signal) (6); the transmitting-side node compares the received return data sequence (6) with the transmission data sequence (4), and if the comparison result is matched, then returns transmission node acknowledge signal (16) to the receiving-side node; the receiving-side node which has received the transmission node acknowledge signal (16) processes the reception data as effective data.

According to further aspect of the invention, a communication control method in which a master node having a control system and a communication control apparatus and a plurality of slave nodes are connected to a bus line, and data are transmitted and received between the master node and the slave nodes comprising the steps of: transmitting-side master node transmits a communication frame comprising a transmitting data sequence (35) having areas corresponding to respective slave nodes; receiving-side node decodes the received communication frame, stores only the data which correspond to the self slave node corresponding to the transmission data sequence (35) as the reception data, and if judging that no errors are found in the communication frame, then returns the stored reception data as they are to the transmitting-side node as a return data sequence (acknowledge signal) (36); the transmitting-side master node compares the received return data sequence (36) with the transmission data sequence (35) transmitted by itself, and if the comparison result is matched, the transmitting-side master node returns a transmission node acknowledge signal (37) to an area assigned to the slave node; if receiving the transmission node acknowledge signal (37), the receiving-side slave node processes the reception data destined to self-node as effective data, and if not receiving the transmission node acknowledge signal (37), the receiving-side slave nodes processes the data, which correspond to the self-slave node corresponding to the received transmission data sequence (35), as non-effective data.

According to further aspect of the invention, the communication control method, wherein if judging that some errors are detected in the received communication frame, the receiving-side slave nodes return data, which are inverted from the data which is stored in self-node areas assigned to the reception buffer register, to the transmitting-side master node as a return data sequence (acknowledge signal) (36).

According to further aspect of the invention, the communication control method comprising the steps of: if judging that some errors are detected in the received communication frame, the receiving-side slave node sets an identification bit in an identification area assigned to self-node in the reception buffer register which has identification areas indicating whether the reception errors are detected or not corresponding to respective slave nodes, and returns data and identification bit, assigned to the self-node area in the reception buffer register, to the transmitting-side master node as a reception data sequence (acknowledge signal) (36).

According to further aspect of the invention, a communication control method in which a master node having a control system and a communication control apparatus and a plurality of slave nodes are connected to a bus line, and data are transmitted and received between the master node and the slave nodes comprising the steps of:

transmitting-side master node transmits a communication frame comprising a transmitting data sequence (35) having areas corresponding to respective slave nodes and effective /non-effective areas which show data are effective or non-effective; receiving-side node decodes the received communication frame, stores only the data and effective /non-effective data, which correspond to self-slave node corresponding to the transmission data sequence (35), as reception data, and if judging that no errors are found in the communication frame, then returns the stored reception data and effective /non-effective data as they are to the transmitting-side node as a return data sequence (acknowledge signal) (36); the transmitting-side master node compares the received return data sequence (36) with the self transmission data sequence (35), and if the comparison result is matched, returns a transmission node acknowledge signal (37) to an area assigned to the slave node; if data of the effective /non-effective area in the received transmission node acknowledge signal (37) is effective, the receiving-side slave node processes the reception data destined to self-node as effective data, and if data of the effective /non-effective area in the received transmission node acknowledge signal (37) is non-effective, the receiving-side slave node processes the reception data destined to self-node as non-effective data.

According to further aspect of the invention, the communication control method, wherein if judging that some errors are detected in the received communication frame, the receiving-side slave node return data, which are inverted from the data which is stored in self-node areas assigned to the reception buffer register, to the transmitting-side master node as a return data sequence (acknowledge signal) (36).

According to further aspect of the invention, the communication control method comprising the steps of: if judging that some errors are detected in the received communication frame, the receiving-side slave node sets an identification bit in an identification area assigned to self-node in the reception buffer register which has identification areas indicating whether the reception errors are detected or not corresponding to respective slave nodes, and returns data and identification bit, assigned to the self-node area in the reception buffer register, to the transmitting-side master node as a reception data sequence (acknowledge signal) (36).

According to further aspect of the invention, a communication control method in which a master node having a control system and a communication control apparatus and a plurality of slave nodes are connected to a bus line, and data are transmitted and received between the master node and the slave nodes comprising the steps of: when any slave node begins to transmitting data, the transmitting-side slave node transmits the communication frame, which includes a transmission data sequence (51) having data areas and slave side identification areas which correspond to the respective slave nodes, to the master node, and the other slave nodes transmits data included in the area which corresponds to self-slave node in the transmission data sequence (51) and identification data, to the master node, following the slave nodes which has started transmission; if judging that no errors are detected in the communication frame, the receiving-side master node decodes the received communication frame and returns the acknowledge signal (52), which corresponds to the respective slave nodes, to the transmitting-side slave nodes; the receiving-side slave nodes which have received the acknowledge signal (52) judges that the transmission to the master node is completed.

According to further aspect of the invention, the communication control method comprises the steps of: the slave side identification area has a flag indicating that the slave node has performed transmission; if an identification flag, indicating whether the slave node has transmitted data or not, is set in the area of the transmission data sequence (51) transmitted from the slave node, the reception master node returns an acknowledge signal only to the slave node.

According to further aspect of the invention, a communication apparatus in which a plurality of nodes having a communication control apparatus are connected to a bus line, and data are transmitted and received between respective communication control apparatuses comprising: the transmitting node comprising: a transmission buffer register for storing transmission data; a transmission control portion for assembling the transmission data stored in the transmission buffer to a transmission frame and transmitting it; the receiving-side node comprising: a reception control portion for decoding the received communication frame to judge whether or not errors are detected in the communication frame; a reception buffer register for storing the data, which has been decoded in the reception control portion, as reception data; a transmission control portion for returning the reception data stored in the reception buffer register as they are to the transmitting side node as the return data sequence (acknowledge signal), when no errors are detected in the communication frame received by the reception control portion.

According to further aspect of the invention, a communication apparatus in which a plurality of nodes having a communication control apparatus are connected to a bus line, and data are transmitted and received between respective communication control apparatuses comprising: the transmitting node comprising: a transmission buffer register for storing transmission data; a return data sequence buffer for storing return data sequence received from the receiving-side; a comparison means for comparing contents of the transmission buffer register with contents of the return data sequence buffer; a transmission control portion for assembling the transmission data stored in the transmission buffer, and if the comparison result is matched, returning a transmission node acknowledge signal to the receiving-side node; the receiving-side node comprising: a reception control portion for decoding the received communication frame to judge whether or not errors are detected in the communication frame, and for processing the reception data as effective data when receiving the transmission node acknowledge signal from the receiving-side slave node; a reception buffer register for storing data, which has been decoded in the reception control portion, as reception data; a transmission control portion for returning the reception data stored in the reception buffer register as they are to the transmitting side node as the return data sequence (acknowledge signal), when no errors are detected in the communication frame received by the reception control portion.

According to further aspect of the invention, a communication apparatus in which a master node having a control system and a communication control apparatus and a plurality of slave nodes are connected to a bus line, and the transmitted data comprises a priority bit and a non-priority bit, if data conflict each other, the data are transmitted and received between the communication control apparatus of the master node and a plurality of slave nodes by sending a priority bit to the bus line, comprising: the transmitting node comprising: a transmission buffer register for storing transmission data destined to respective slave nodes; a return data sequence buffer for storing return data sequence received from the receiving-side slave nodes; a comparison means for comparing contents of the transmission buffer register with contents of the return data sequence buffer; a transmission control portion for assembling the transmission data including areas, corresponding to respective slave node, stored in the transmission buffer, and if the comparison result is matched, returning transmission node acknowledge signals to areas corresponding to the receiving-side slave nodes; the receiving-side node comprising: a reception control portion for decoding the received communication frame to judge whether or not errors are detected in the communication frame, and for processing the reception data as effective data when receiving the transmission node acknowledge signal from the transmitting-side master node; a reception buffer register for storing areas, which correspond to self slave node decoded in the reception control portion, as it is, and for storing areas, which correspond to other slave nodes, by inserting non-priority bit; a transmission control portion for returning the reception data stored in the reception buffer register as they are to the transmitting side node as the return data sequence (acknowledge signal), when no errors are detected in the communication frame received by the reception control portion.

According to further aspect of the invention, the communication apparatus, when judging no errors are detected in the received communication frame, the receiving-side slave node for storing inverted data of the area, which corresponds to the self slave node in the reception buffer register, and for inserting non-priority bit into areas, which correspond to other slave nodes.

According to further aspect of the invention, the communication apparatus, the reception buffer register comprises an identification area, which indicates whether or not reception errors are detected corresponding to respective slave nodes, and a data area corresponding to self slave node; the receiving-side slave node, when judging no errors are detected in the received communication frame, for setting an identification bit in the identification area corresponding to the self slave node of the reception buffer register, and for a non-priority bit into the data area and the identification area corresponding the other slave nodes.

According to further aspect of the invention, a communication apparatus in which a master node having a control system and a communication control apparatus and a plurality of slave nodes are connected to a bus line, and the transmitted data comprises a priority bit and a non-priority bit, if data conflict each other, the data are transmitted and received between the communication control apparatus of the master node and a plurality of slave nodes by sending a priority bit to the bus line, wherein the transmitting-side node comprising: a transmission buffer register for storing transmission data destined to respective slave nodes; a return data sequence buffer for storing return data sequence having data area received from the receiving-side slave nodes, and effective /non-effective areas; a comparison means for comparing contents of the transmission buffer register with contents of the return data sequence buffer; a transmission control portion for assembling the transmission data including areas, corresponding to respective slave node, stored in the transmission buffer, and if the comparison result is matched, returning transmission node acknowledge signals to areas corresponding to the receiving-side slave nodes; the receiving-side node comprising: a reception control portion for decoding the received communication frame to judge whether or not errors are detected in the communication frame, and for processing the reception data as effective data when receiving the transmission node acknowledge signal from the transmitting-side master node, and processing the reception data destined to self-node as non-effective data when data in the effective/non-effective area indicate to be non-effective; a reception buffer register for storing reception data and effective /non-effective data in the area, which correspond to self slave node decoded in the reception control portion, as they are, and for storing areas, which correspond to other slave nodes, by inserting non-priority bit; a transmission control portion for returning the reception data stored in the reception buffer register as they are to the transmitting side node as the return data sequence (acknowledge signal), when no errors are detected in the communication frame received by the reception control portion.

According to further aspect of the invention, the communication apparatus, wherein when judging no errors are detected in the communication frame, the receiving-side slave node for storing inverted data of the area, which corresponds to the self slave node in the reception buffer register, and for inserting non-priority bit into areas, which correspond to other slave nodes.

According to further aspect of the invention, the communication apparatus, the reception buffer register comprises an identification area, which indicates whether or not reception errors are detected corresponding to respective slave nodes, and a data area corresponding to self slave node; the receiving-side slave node, when judging no errors are detected in the received communication frameÅAfor setting an identification bit in the identification area corresponding to the self slave node of the reception buffer register, and for a non-priority bit into said data area and said identification area corresponding the other slave nodes.

According to further aspect of the invention, a communication control apparatus in which the master node and a plurality of slave nodes having the control system and the communication control apparatus respectively are connected to the bus line, and the transmitted data comprises the priority bit and non-priority bit, and the data are transmitted and received between the communication control apparatus of the master node and a plurality of slave nodes, using the bus line of the bus line control method to transmit the priority bit to the bus line in case of data conflict comprises the transmitting-side master node and the receiving-side slave node: wherein the transmitting-side node comprising: a transmission buffer register for storing transmission data destined to the master node corresponding to respective slave nodes and slave side identification area, and for storing area corresponding to other slave nodes by inserting non-priority bit; a reception control portion having means for detecting that any one of slave nodes starts transmission and for judging that normal transmission has been carried out when the acknowledge signal has been received from the transmitting-side master node; a transmission control portion for assembling transmission data, including areas corresponding to respective slave nodes stored in the transmission buffer register, to a communication frame and for transmitting it when the transmission demand is generated, and for assembling transmission data, including areas corresponding to respective slave nodes stored in the transmission buffer register, to transmission frame, and transmitting it after other slave node has started the transmission, when detecting any one of other slave nodes, which has started transmission, at the reception control portion; the receiving-side master node comprising: a reception control portion for decoding the received communication frame to judge whether or not errors are detected in the communication frame; a reception buffer register for storing data decoded in the reception control portion and slave node identification data; a transmission control portion for generating and returning an acknowledge signal in the acknowledge signal area corresponding to only the slave node of reception data from the transmitting-side slave nodes, in which a flag is set at the slave node identification data, when no errors are detected in the communication frame received by the reception control portion.

According to further aspect of the invention, the communication apparatus: wherein the transmission buffer register of the slave node comprises area indicating that slave nodes have performed transmission.

BRIEF DESCRIPTION OF THE DRAWINGS

The present invention is described in detail with reference to the appended drawings in which like reference numerals designate like elements, and wherein:

FIG. 10 shows a return data sequence for Embodiment 3.

DETAILED DESCRIPTION OF THE PREFERRED EMBODIMENTS (Embodiment 1)

Figure 1:
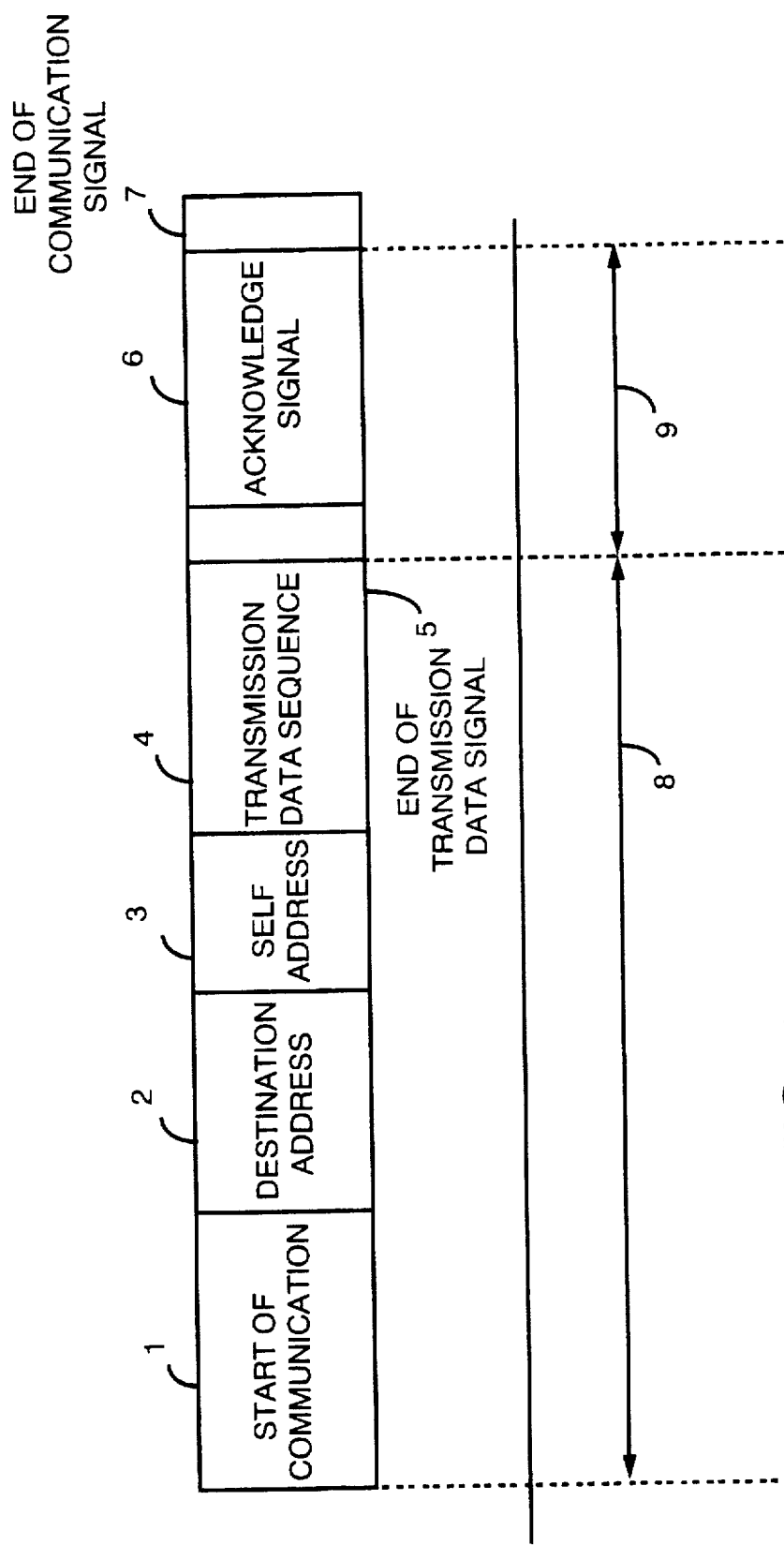
FIG. 1 shows a communication frame format used for the communication apparatus for an embodiment of the present invention.
Figure 2:
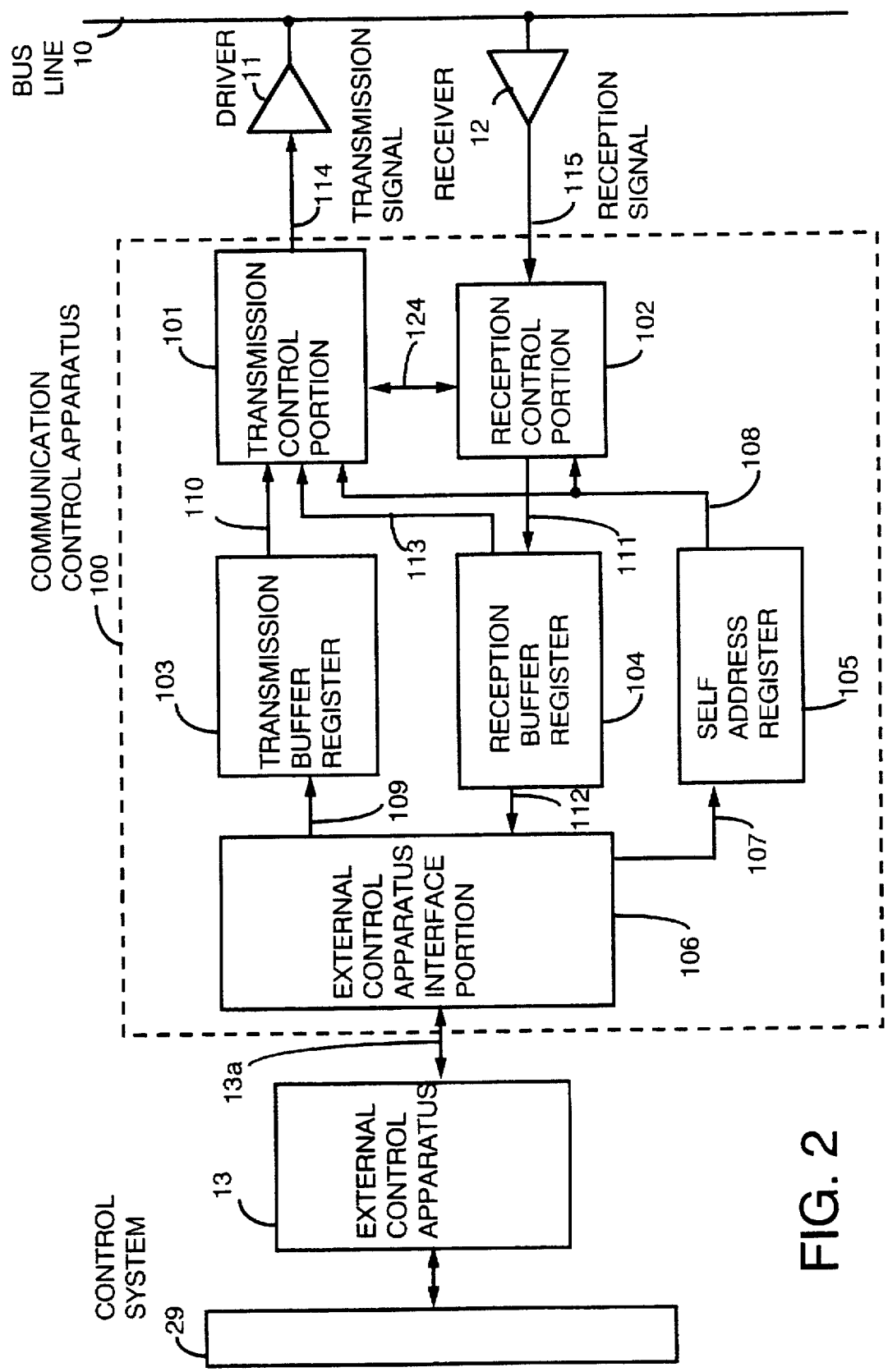
FIG. 2 is a schematic diagram of the communication control apparatus 100 for the first embodiment.

FIG. 1 shows a communication frame format used for the communication control apparatus 100 of an embodiment of the present invention. FIG. 2 is a schematic diagram of the communication control apparatus 100 of the first embodiment. The embodiments of the present invention is explained as follows using FIG. 1 and FIG. 2.

In FIG. 1, the communication frame format comprises a start of communication signal 1 which indicates start of communication, a destination address 2 which indicates destination to transmit, a self address 3 which indicates an origin of transmission, a transmission data sequence 4 which indicates a data area to transmit, an end of transmission data signal 5 which indicates termination of transmission data, a return data sequence 6 which the receiving-side returns to the transmitting-side in case that the receiving-side detects no errors in the signals received from the transmitting-side, and an end of communication signal 7 which indicates termination of communication frame. Signals 1–5 are sent from the transmitting-side, and the signal 9 is sent form the receiving-side. In the present invention, the receiving-side returns the return data sequence 6 to the transmitting-side. The return data sequence 6 is the received data itself which the receiving-side has received from the transmitting-side. That is, the return data sequence 6 is the same as the transmission data sequence 4.

FIG. 2 is a schematic diagram of the communication control apparatus 100 of the first embodiment. Construction and operation of the first embodiment is explained using FIG. 2. First, transmission operation is explained. The external control apparatus 13 is connected to an external control apparatus interface portion 106 in the communication control apparatus 100 via line 13a. In case the transmission demand "Drive the wiper" for example, is requested from the control system 29, the external control apparatus 13 sends a transmission demand to the external control apparatus interface portion 106 via the line 13a, and transfers transmission data to the communication control apparatus 100. The transferred transmission data are written in the transmission buffer register 103 via the external control apparatus interface portion 106 and a line 109. The written transmission data are inputted into a transmission control portion 101 via a line 110. The transmission control portion 101 assembles this transmission data to a communication frame, and sends it to a bus line 10 as a transmission signal 114 via a driver 11.

The reception operation is explained below. The reception signal 115 which is received from the receiver 12 connected to the bus line 10 is inputted into the reception control portion 102. The reception control portion 102 compares a destination address 2 of the reception signal with a self address written in advance in a self address register 105 by the external control apparatus 13. If the comparison result is matched the state moves to a reception process.

The reception control portion 102 writes the reception data into a reception buffer register 104 via a line 111. The reception control portion 102 gives instructions to the transmission control portion 101 via line 124 so that the transmission control portion 101 sends a return data sequence in case that the reception control portion 102 does not detect any reception errors. The transmission control portion 101 assembles the return data sequence according to data which is stored in the reception buffer 104, and returns it via line 113. The reception data in which any errors are not detected in the reception buffer register 104 is read out into the external control apparatus 13 via the line 112 and the external control apparatus interface portion 106.

Figure 3:
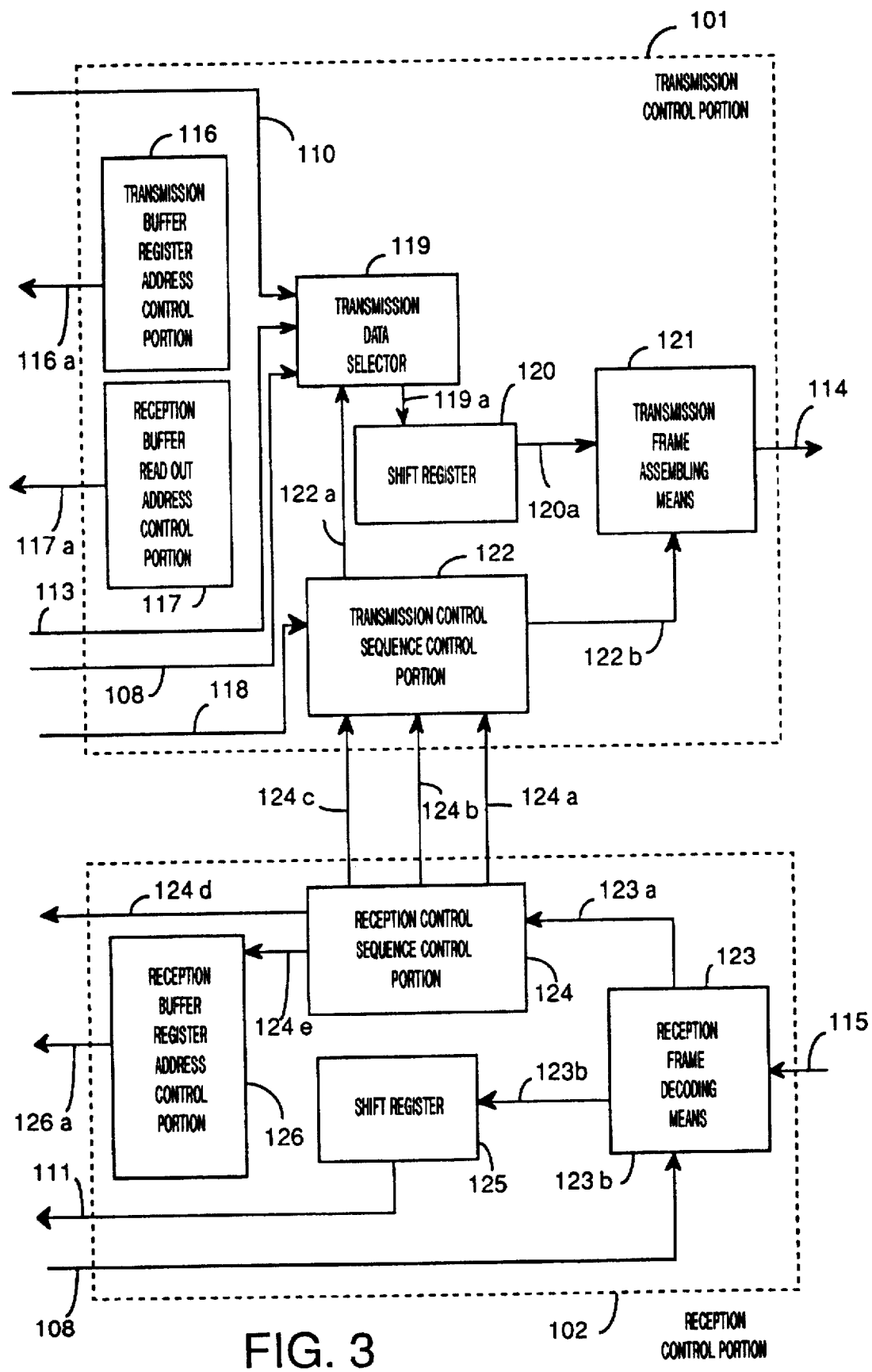
FIG. 3 shows a detailed block diagram of the transmission control portion 101 and the reception control portion 102.

FIG. 3 is a detailed block diagram of the transmission control portion 101 and the reception control portion 102. Further operation in the transmission control portion and the reception control portion is explained in detail using FIG. 3. First, transmission operation is explained below. The transmission buffer full signal 118 which indicates the completion of writing the transmission data in the transmission buffer register 103 (not illustrated) is inputted into the transmission control sequence control portion 122. The transmission control portion 101 is activated by the reception of this signal 118. The transmission data selector 119 selects the transmission data 110 which is stored in the address of the transmission buffer assigned by the transmission buffer readout address signal 116a which is controlled by the transmission buffer register address control portion 116. The selected transmission data are inputted into the shift register 120 via line 119a, the shift register 120 converts data from parallel data to serial data (P/S shift register). The transmission data converted into serial data by P/S shift register is inputted into the transmission frame assembling meas 121 via the line 120a. The transmission frame assembling means 121 assembles the communication frame by adding the start of communication signal 1 and so on to the inputted transmission data, and transmits it to the bus line as a transmission signal 114.

Reception operation is explained below. The reception signal 115 is inputted into the reception frame decoding means 123. The self address data on a line 108 is compared with the destination address 2 included in the input reception signal by the reception frame decoding means 123. If the comparison result is matched the state moves to a reception process. A serial reception data on a line 123b decoded by the reception frame decoding means 123 is inputted into a shift register 125 which converts the data from serial data to parallel data (S/P shift register). A reception buffer register address control portion 126 receives a reception buffer register address control signal on a line 124e which is transmitted from the reception control sequence control portion 124 and then determines an address of the reception buffer in which the reception data 111 converted into parallel data are to be written. Then, the reception data 111 is written in the reception buffer register 104 by a reception buffer writing control signal 124d sent from the reception control sequence control portion 124.

The reception control sequence control portion 124 receives a signal which indicates a state of the reception signal on a line 123a received from the reception frame decoding means 123, and then outputs a control signal 124a–124c to the transmission A control portion 101. Control signal on line 124a is outputted when an end of transmitted data signal 5 of a communication frame is detected. When the transmission control sequence control portion 122 receives the control signal on the line 124a, the transmission control sequence control portion 122 gives instructions via a line 122a so that the transmission data selector 119 selects a reception data 113 inputted from the reception buffer register 104. In case that the reception frame decoding means 123 does not detect any errors in the reception data, the reception control sequence control portion 124 outputs the return data transmission control signal to the transmission control sequence control portion 122 via a line 124b. A reception buffer readout address signal 117a is outputted from the reception buffer readout address control portion 117 in the transmission control portion 101. The reception data 113 is inputted into P/S shift register 120 as a return data via the transmission data selector 119 in response to the reception buffer readout address signal 117a, and the reception data 113 is converted into serial data. The serial data are encoded as the return data by the transmission frame assembling means 121, and transmitted as a return data sequence to the bus line 10 via the line 114.

(Embodiment 2)

Figure 4:
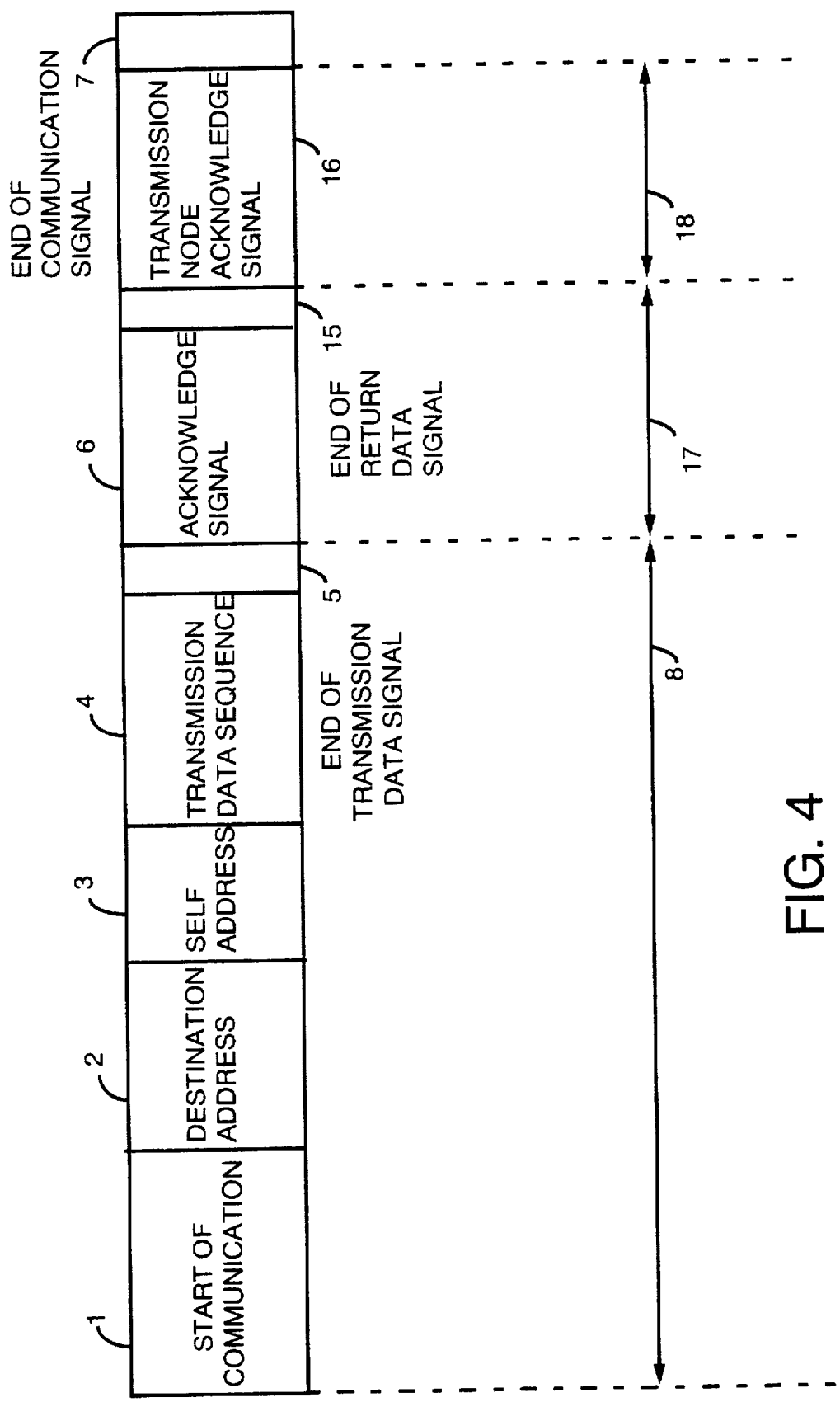
FIG. 4 shows a communication frame format of the present invention.
Figure 5:
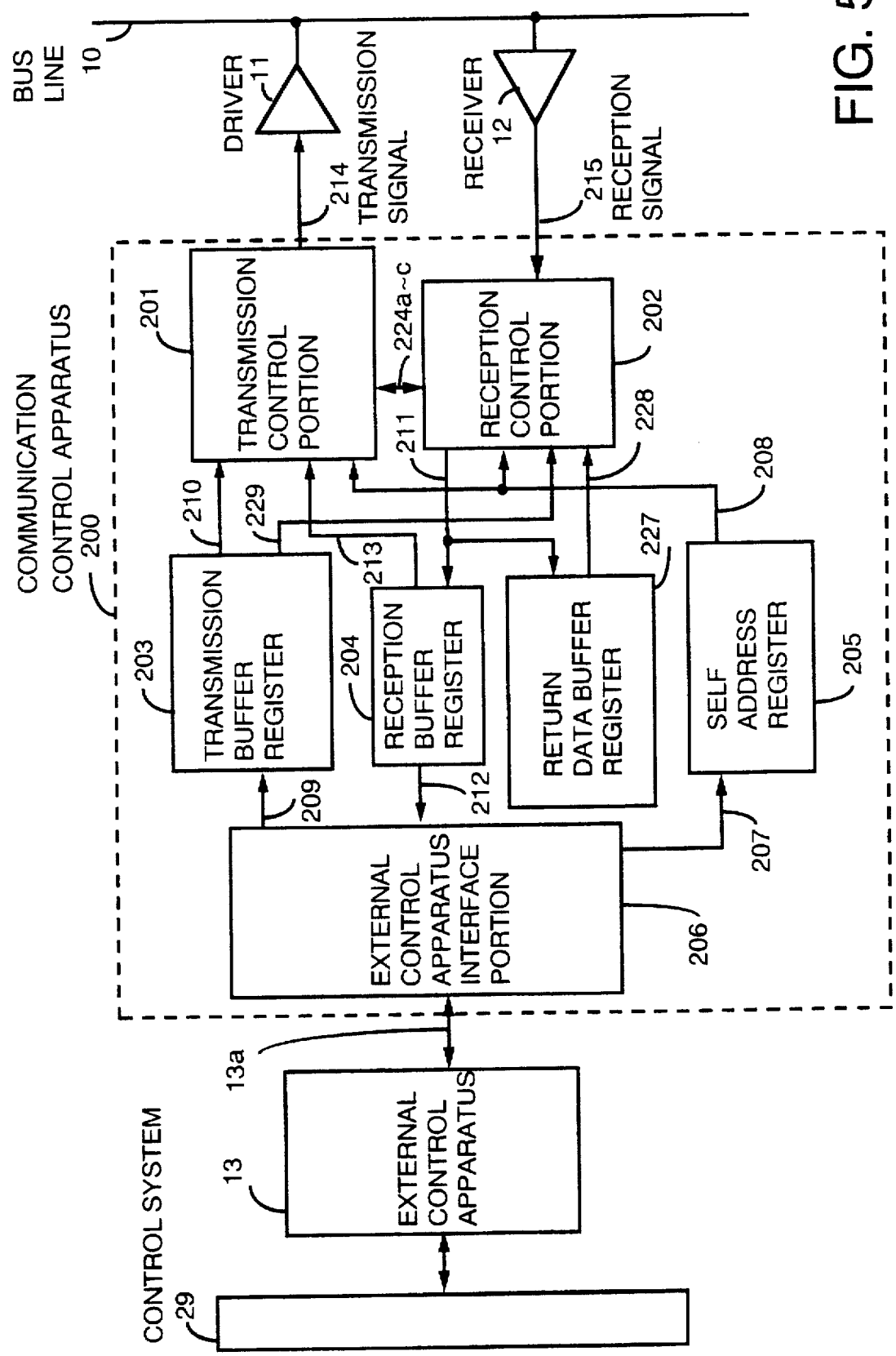
FIG. 5 is a schematic diagram of the communication control apparatus 200 for a second embodiment.

FIG. 4 shows a communication frame format of a second embodiment of the present invention. FIG. 5 is a schematic diagram of a communication control apparatus 200 of a second embodiment. The second embodiment of the present invention is explained using FIG. 4 and FIG. 5.

In FIG. 4, the communication frame format comprises a start of communication signal 1 which indicates start of communication, a destination address 2 which indicates destination to transmit, a self address 3 which indicates an origin of transmission, a transmission data sequence 4 which indicates a data area to transmit, an end of transmission data signal 5 which indicates termination of transmission data, a return data sequence 6 which the receiving-side returns to the transmitting-side in case that the receiving-side detects no errors in the signals received from the transmitting-side, an end of communication signal 15 which indicates termination of communication frame, a transmission node acknowledge signal 16, and an end of communication signal 7 which indicates termination of communication frame. Signals in the areas 8 and 18 are sent from the transmitting-side, and signals in the area 17 are sent from the receiving-side.

In the present invention, the receiving-side returns the return data sequence 6 to the transmitting-side. The return data sequence 6 is the received data itself which the receiving-side has received from the transmitting-side. That is, the return data sequence 6 is the same as the transmission data sequence 4. The transmission node acknowledge signal 16 is an acknowledge signal which is transmitted from the transmission node to the reception node, in case that the return data sequence 6 are matched with the transmission data sequence 4 at the transmitting-side.

FIG. 5 is a schematic diagram of a communication control apparatus 200 of a second embodiment. Construction and operation of the second embodiment is explained using FIG. 5 as follows. The external control apparatus 13 is connected to an external control apparatus interface portion 206 in the communication control apparatus 200 via line 13a. In case the transmission demand "Drive the wiper", for example, is requested from the control system 29, the external control apparatus 13 sends a transmission demand to the external control apparatus interface portion 206 via the line 13a, and transfers transmission data to the communication control apparatus 200. The transferred transmission data are written in the transmission buffer register 203 via the external control apparatus interface portion 206 and a line 209. The written transmission data are inputted into a transmission control portion 201 via a line 210. The transmission control portion 201 assembles this transmission data to a communication frame, and sends it to a bus line 10 as a transmission signal 214 via a driver 11.

The reception operation is explained below. The reception signal 215 which is received from the receiver 12 connected to the bus line 10 is inputted into the reception control portion 202. The reception control portion 202 compares a destination address 2 of the reception signal with a self address written in advance in a self address register 205 by the external control apparatus 13. If the comparison result is matched the state moves to a reception process.

The reception control portion 202 writes the reception data into a reception buffer register 204 via a line 211. The reception control portion 202 gives instructions to the transmission control portion 201 via line 224 so that the transmission control portion 201 sends a return data sequence in case that the reception control portion 202 does not detect any reception errors. The transmission control portion 201 assembles the return data sequence according to data which is stored in the reception buffer 204 via the line 213, and returns it to the transmitting-side using the area of the return data sequence 6.

Operation of the transmission node side when it receives the return data sequence 6 is explained below. The transmission node side writes the received return data sequence 6 into the return data buffer register 227 connected via the reception control portion 202 via the line 211. The data in the transmission buffer register 203 connected to the reception control portion 204 is compared with the data in the return data buffer register 227 at the reception control portion 202 via the lines 229 and 228, respectively, and the comparison result is transmitted to the transmission control portion 201 via the line 224. In case that the comparison result of the data between the transmission buffer register 203 and the data in the return data buffer register 227 is matched, the transmission control porion 201 transmits a transmission node acknowledge signal 16 to the reception node as an acknowledge signal. In this example, the data set in the self address register is transmitted as the acknowledge signal.

In case that the reception node receives the transmission node acknowledge signal 16 from the transmission node, the reception node sends the reception data in the reception buffer register 204 to the external control apparatus interface porion 206 via the line 212, and then the external control apparatus interface potion 206 transmits the data to the external control apparatus 13 via a line 13a.

Figure 6:
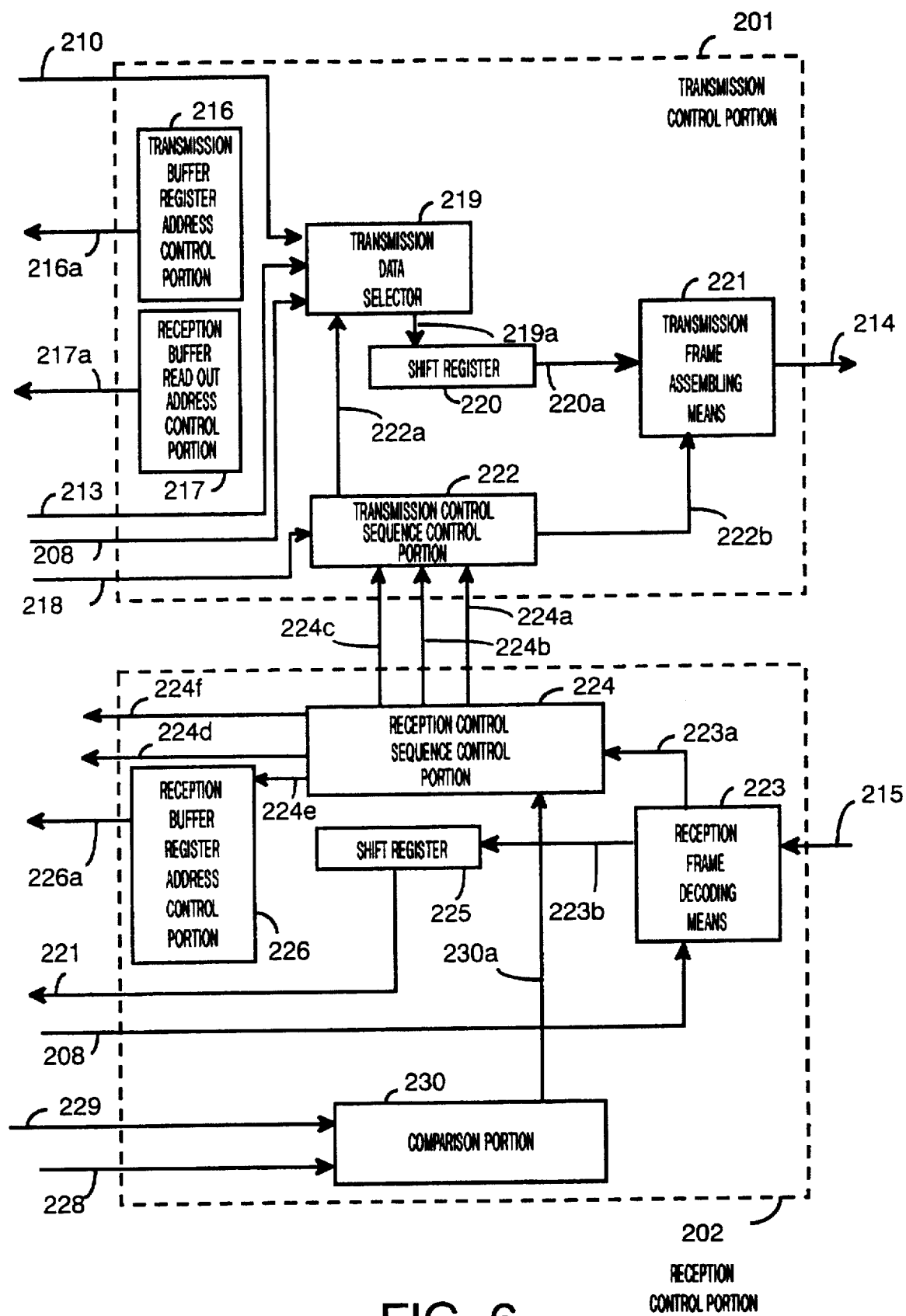
FIG. 6 is a block diagram of transmission control portion 201 and reception control portion 202.

An operation of the transmission control portion and the reception control portion is further explained using FIG. 6. FIG. 6 shows a detailed block diagram of a transmission control portion 201 and the reception control portion 202. First, the transmission operation is explained. The transmission buffer full signal 218 which indicates the completion of writing the transmission data in the transmission buffer register 203 is inputted into the transmission control sequence control portion 222. The transmission control portion 201 is activated by the reception of this signal 218. Receiving this signal, the transmission control portion 201 is activated. The transmission data selector 219 transmits the transmission buffer readout address signal from the transmission buffer register address control portion 216 to a line 216a in response to the selector control signal on a line 222a, and selects the transmission data via the line 210 which is stored in the transmission buffer register 203 (see FIG. 5). The selected transmission data are inputted into a P/S shift register 220 via a line 219a. The transmission data converted into the serial data by the P/S shift register 220 is inputted into the transmission frame assembling means 221 via a line 220a. The transmission frame assembling means 221 assembles a communication frame by adding the start of communication signal and so on to the inputted transmission data, and then transmits it to the bus line 10 via a line 214 as a transmission signal.

A reception operation is explained below. The reception signal 215 is inputted into the reception frame decoding means 223. The self address data on a line 208 is compared with the destination address 2 included in the input reception signal by the reception frame decoding means 223. If the comparison result is matched, the state moves to a reception process. A serial reception data on a line 223b decoded by the reception frame decoding means 223 is inputted into a shift register 225 which converts the data from serial data to parallel data (S/P shift register). A reception buffer register address control portion 226 receives an address control signal of a reception/return data buffer register on a line 224e which is outputted from the reception control sequence control portion 224, then the reception/return data buffer register address control portion 226 determines an address in the reception buffer register in which the reception data 211 converted into the parallel data are to be written via 226a. Then, the reception data 211 is written in the reception buffer register 204 by the reception/returning data writing control signal on line 224d from the reception control sequence control portion 224.

The reception control sequence control portion 224 receives a signal on a line 223a which indicates state of the reception signal from the reception frame decoding means 223 and then transmits the control signal to the transmission control porion 201 via lines 224a~224c. When the end of transmission data signal 5 of the communication frame is detected, the control signal is sent on a line 224a. When the transmission control sequence control portion 222 receives this control signal, the transmission control sequence control portion 222 transmits a control signal to line 222a so that the transmission data selector 219 selects the reception data on a line 213 from the reception buffer register.

In case that reception control sequence control portion 224 does not detect any errors in the reception data, the reception control sequence control portion 224 sends a return data transmission control signal on a line 224b. The reception buffer readout address signal is sent on a line 217a from the reception buffer readout address control portion 217 in the transmission control portion 201. The reception data on a line 213 is inputted into the P/S shift register 220 via the transmission data selector 219 as a return data and then converted into a serial data.

Operation of the transmission node to the received return data sequence 6 is explained below. In the transmission node, received return data sequence 6 is inputted into the reception frame decoding means 223 as a reception signal. The serial return data on a line 223b which is decoded by the reception frame decoding means 223 is inputted into the S/P shift register 225. The reception / return data buffer register address control portion 226 receives the address control signal of the reception/return data buffer register on a line 224e from the reception control sequence control porion 224, and transmits the address of the return data buffer register in which the return data converted into the parallel data are to be written. This return data are written in the return data buffer register 227 (see FIG. 5) by the reception/return buffer writing control signal on a line 224d transmitted from the reception control sequence control porion 224.

After all return data are written in the return data buffer register 227, the comparison portion 230 compares data from the return data buffer register 227 with data from the transmission buffer register 203 via lines 228 and 229, respectively, and sends the comparison result to the reception control sequence control portion 224 via a line 230a. In case that the comparison result is matched, the reception control sequence control portion 224 sends the transmission acknowledge signal to the transmission control sequence control portion 222 via a line 224c. The transmission control sequence control portion 222 transmits a control signal to a line 222a so that the transmission data selector 219 selects self address on the line 208. The data stored in the self address register 205 is inputted into the P/S shift register via the transmission data selector 219 and then converted into the serial data. The data of the self address register is encoded by the transmission frame assembling means 221 and transmitted as the transmission node acknowledge signal via the line 214.

In case of receiving a transmission node acknowledge signal 16 from the transmission node, the reception frame decoding means 223 sends the information to the reception control sequence control porion 224 via a line 223a. When the reception control sequence control porion 224 detects the reception data correctly, it transmits the reception data effective signal 224f to the external control apparatus interface portion 206. In case of receiving this signal, the external control apparatus interface portion 206 reads the reception data from the reception buffer register 204 via a line 212, and then transmits the reception data to the external control apparatus 13 via a line 13a.

(Embodiment 3)

Figure 7:
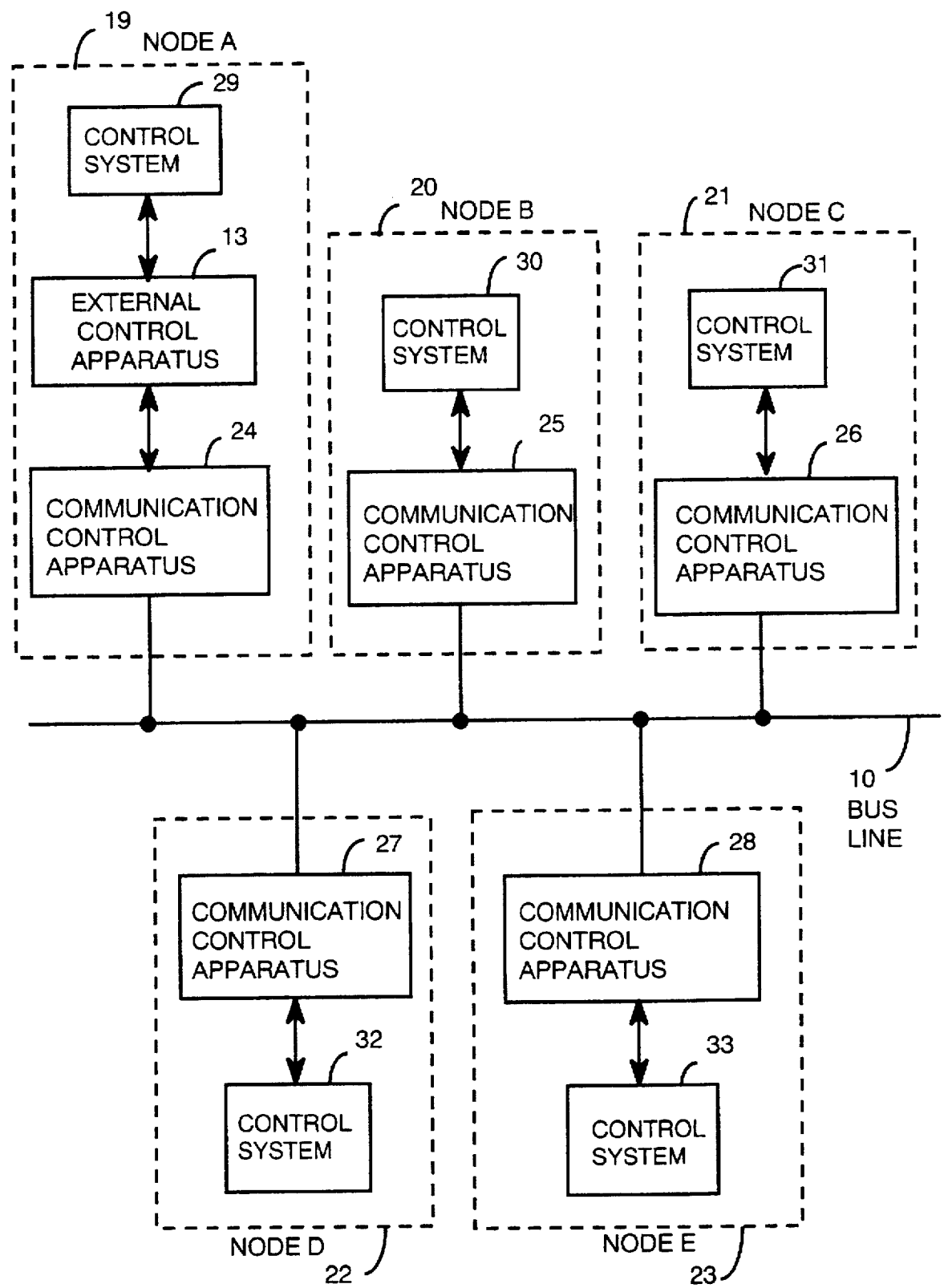
FIG. 7 shows an example of LAN system using the communication control apparatus for Embodiment 3.

A LAN system which uses a communication control apparatus of a third embodiment of the present invention is explained using FIG. 7. In the system of the third embodiment, five nodes are connected to a bus line 10. Suppose the node A mainly controls this system. Node A comprises a communication control apparatus 24, an external control apparatus 13, and a control system 29. Node A is called master node. Nodes B, C, D, E comprise communication control apparatuses 25, 26, 27, 28 and the control systems 30, 31, 32, 33, respectively. These nodes are called slave nodes.

Figure 8:
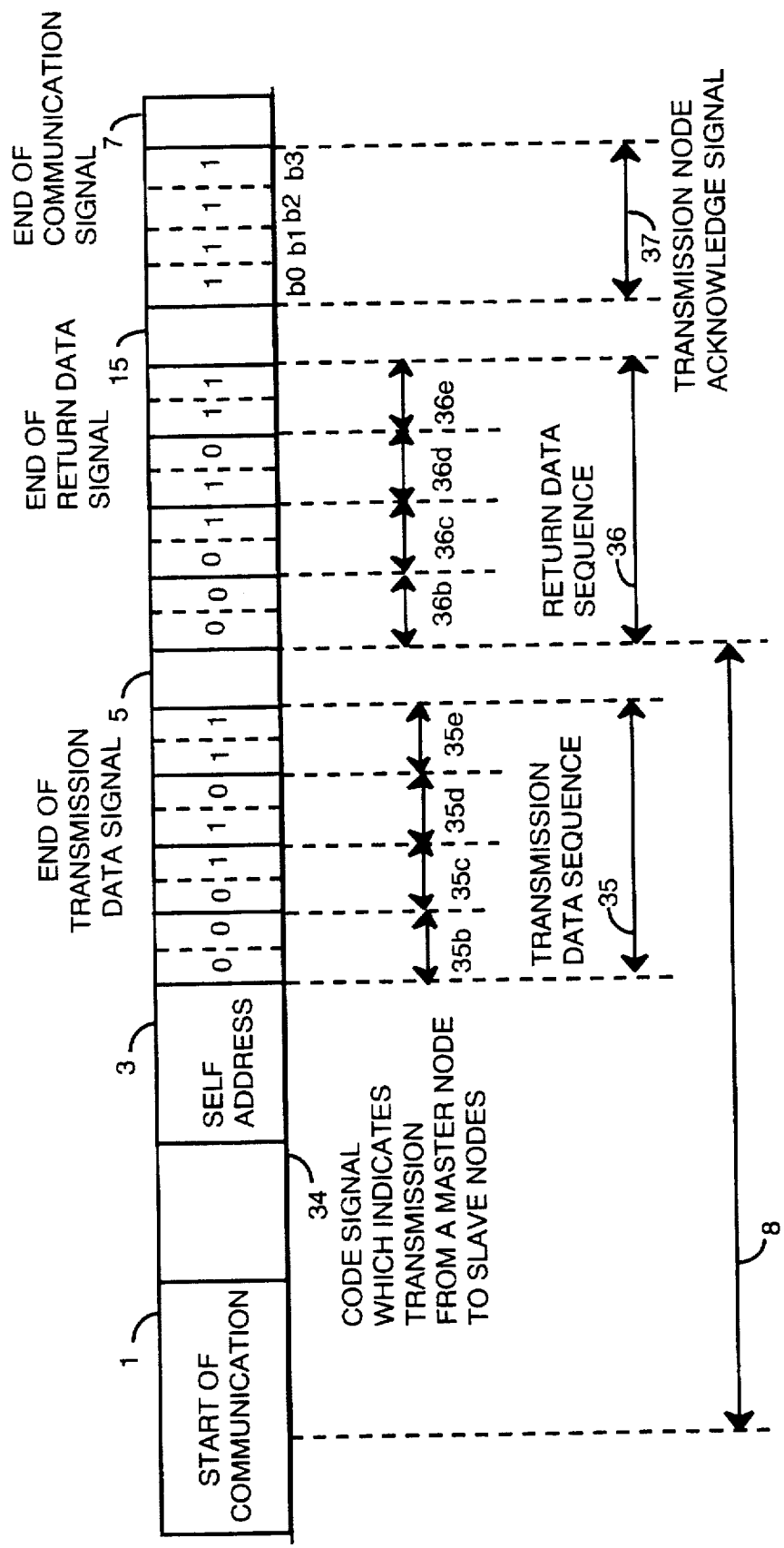
FIG. 8 shows a communication frame format for Embodiment 3 of the present invention.

FIG. 8 shows a communication frame format for a third embodiment of the present invention. This communication frame format comprises a start of communication signal 1 which indicates start of communication, a code signal 34 which indicates transmission from a master node to slave nodes, a self address 3 which indicates an origin of transmission, that is the master node, a transmission data sequence 35 which indicates areas of data to be communicated, an end of transmission data signal 5 which indicates termination of transmission data, a return data sequence 36 which the receiving-side returns to the transmitting-side in case that the receiving-side detects no errors in the signals received from the transmitting-side, an end of return data signal 15 which indicates termination of the return data sequence, a transmission node acknowledge signal 37 and an end of communication signal 7 which indicates termination of the communication frame. The transmitting-side (master node) transmits the signals using areas 8 and 37. Area 36 is used so that the receiving-side (slave nodes) transmits signals. In the system of a third embodiment, the master node A transmits the communication frame, and all slave nodes B, C, D, E receive for processing the communication frame.

The transmission data sequence 35 is divided into areas 35b, 35c, 35d, 35e, and each data corresponds to data received by the slave nodes B, C, D, E. The return data sequence is divided into areas 36b, 36c, 36d, 36e, which correspond to the return data of slave nodes B, C, D, E, respectively. Each slave node returns the reception data itself to the area which is assigned to the transmission data sequence. That is, the return data sequence 36 is the same as the transmission data sequence 35. The transmission node acknowledge signal 37 is an acknowledge signal which is sent from the transmission node to the reception node in case that the return data sequence 36 and the transmission data sequence 35 match at the transmitting-side.

Figure 11:
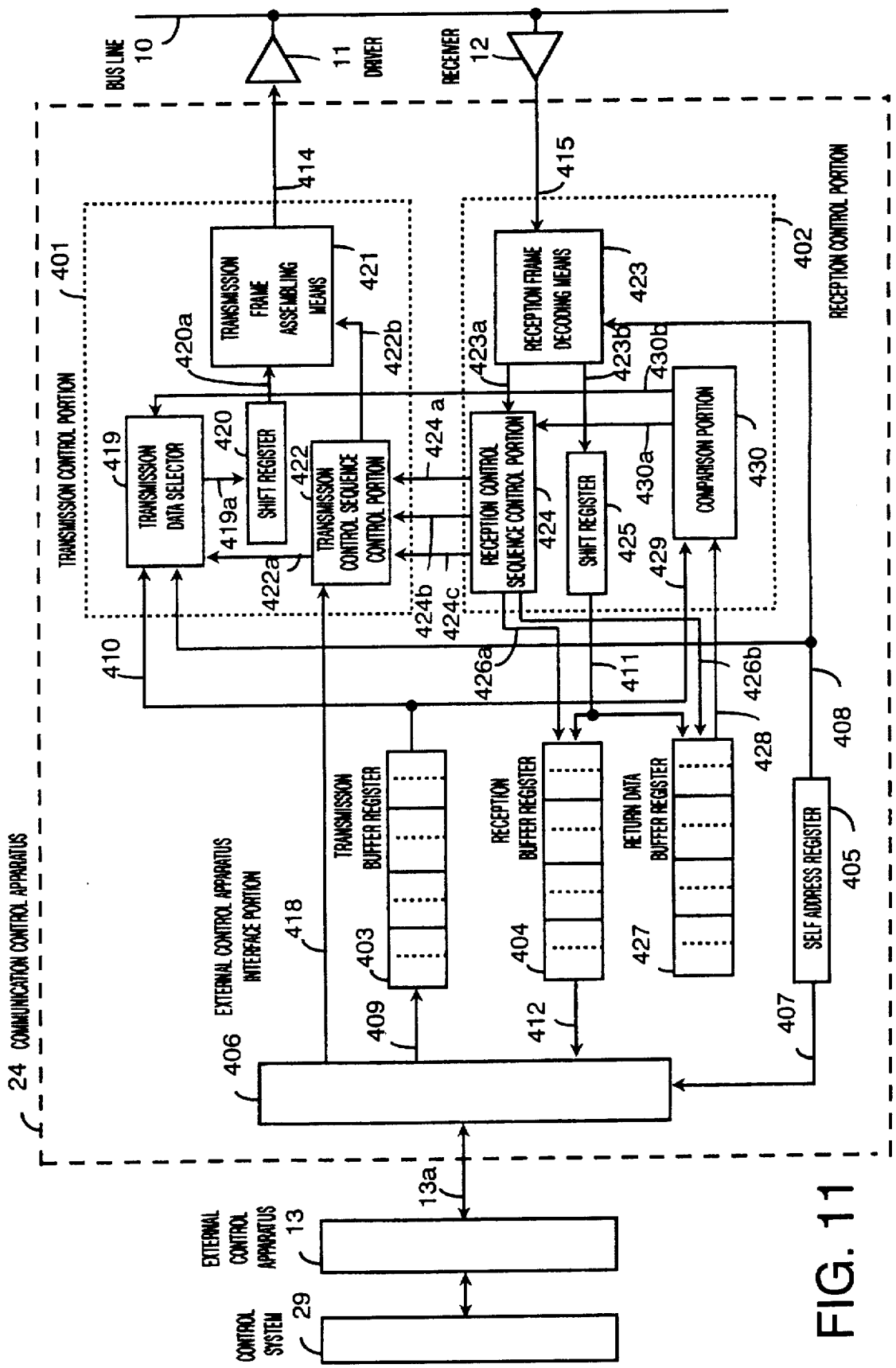
FIG. 11 shows communication control apparatus 400 of the master node for Embodiment 3.

First, transmission operation of the master node A is explained in detail using FIG. 11. The transmission data sent from the external control apparatus 13 is written into the transmission buffer register 403 via an external control apparatus interface portion 406. After completing the writing, the external control apparatus interface portion 406 transmits the communication buffer full signal which indicates completion of writing to a communication control sequence control portion 422 via a line 418. When receiving this transmission buffer full signal, the transmission control portion 401 is activated. The transmission data selector 419 selects a transmission data on a line 410 received from the transmission buffer register 403 in response to the selector control signal on a line 422a, and transmits it to a P/S shift register 420 via a line 419a. The transmission data converted into the serial data are inputted into the transmission frame assembling means 421 from the P/S shift register 420 via a line 420a. The transmission frame assembling means 421 assembles a communication frame by adding the start of communication signal 1 and the code signal 34, which indicates the transmission from a master node to slave nodes and so on, to the inputted transmission data, and then transmits it to a bus line 10 via a line 414 as a transmission signal.

Figure 9:
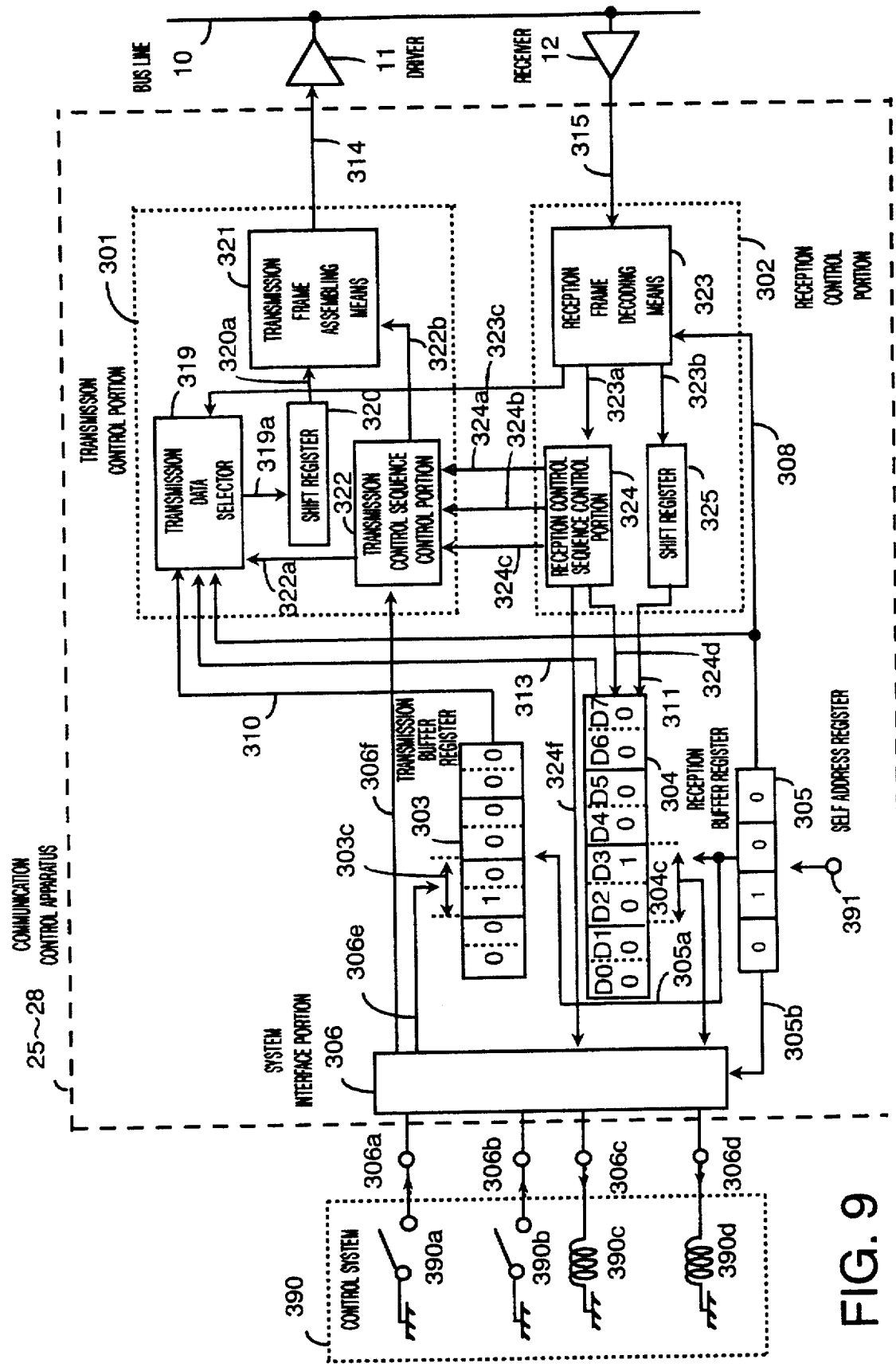
FIG. 9 shows a communication control apparatus 300 of the slave node for Embodiment 3.

FIG. 9 shows a construction of a communication control apparatuses 25~28 of the slave nodes. For example, FIG. 9 indicates the slave node C on the LAN system in FIG. 7. Control system 390 of the node C comprises switch 390a, 390b, actuator 390c, 390d, and they are connected to the control system interface portion 306 via lines 306a, 306b, 306c, 306d, respectively.

Operation of the slave node in case that slave node C receives the communication frame from the master node A shown in FIG. 7 is explained using FIG. 9. The reception signal on a line 315 is inputted into a reception frame decoding means 323. In case that the reception frame decoding means 323 detects the code signal 34 which indicates transmission from master to slave, the reception control portion 302 moves to the reception process. The serial reception data on a line 323b which is decoded by the reception frame decoding means 323 is inputted into a S/P shift register 325. The reception data on a line 311 converted into a parallel data are written in a reception buffer register 304 by the reception/return buffer writing control signal on a line 324d which is sent from the reception control sequence control portion 324.

The data "0100", which indicates slave node C, is set in the self address register 305 according to an outside terminal 391. The data "0100" control a reception buffer register 304 so that only the area indicated at 304c is effective, and the other areas are reset, and filled by "0". That is, only data "01" in area 35c is effective among data "00011011" in the transmission data sequence 35 in FIG. 8. At this point, data stored in reception buffer register 304 become "00010000".

The reception control sequence control portion 324 receives a signal which indicates a state of the reception signal from the reception frame decoding means 323 on a line 323a, and transmits a control signal to the transmission control sequence control portion 322 of the transmission control portion 301 via lines 324a~324c. When the reception frame decoding means 323 detects an end of transmission data signal 5 in the communication frame, the reception control sequence control portion 324 transmits the control signal on a line 324a. According to this control signal, the transmission control sequence control portion 322 transmits the control signal on a line 322a to a transmission data selector 319 to select the reception data in reception buffer register 304 via a line 313. In case that no errors are detected, the reception control sequence control portion 324 transmits a return data transmission control signal onto a line 324b. The reception data on a line 313 is inputted into the P/S shift register 320 via transmission data selector 319 as the return data, and converted into the serial data. This serial data are encoded as the return data by the transmission frame assembling means 321, and transmitted as the return data sequence via a line 314. The data sequence returned from node C at this time is "00010000".

The other slave nodes B, D, E perform in the same way as explained above. That is, the node B causes the area 35b of the transmission data sequence to be effective reception data, and node D causes the area 35d of the transmission data sequence to be effective reception data, and node E causes the area 35e of the transmission data sequence to be effective reception data. The data sequence to be returned is "00000000" for node B, "00001000" for node D, and "00000011" for node E, as shown in FIG. 10. Bus line 10 of each node is connected by wired OR logic, and the priority bit is "1", and the non-priority bit is "0". That is, in case that a plurality of nodes transmit data at the same time, the data of the node (bit) which has transmitted a bit "1" are sent to the bus line as a priority bit. In this communication example, the nodes B,C, D, E send return data sequence at the same time, and then the return data sequence 36 on the bus line 10 is "00011011".

Operation of the master node A which responds to received return data sequence 36 is explained below using FIG. 11. In the master node A, the received return data sequence 36 is inputted into a reception frame decoding means 423 as a reception signal. The serial return data on a line 423b which is decoded by the reception frame decoding means 423 is inputted into a P/S shift register 425. Then, the return data on a line 411 converted into a parallel data are written into a return data buffer register 427 according to a return buffer writing control signal on a line 426b outputted from the reception control sequence control porion 424. After all return data are written in the return data buffer register 427, the comparison portion 430 compares data in the return data buffer register 427 with data in the transmission buffer register 403 via lines 428 and 429, respectively. Then, the comparison portion 430 transmits the comparison termination signal to the reception control sequence control portion 424 via a line 430a.

When receiving the comparison termination signal, the reception control sequence control portion 424 transmits a transmission acknowledge signal to the transmission control sequence control portion 422 via a line 424c. According to this transmission acknowledge signal, the transmission control sequence control portion 422 transmits the control signal via a line 422a to the transmission data selector 419 so that the transmission data selector 419 selects the data on a line 430b from the comparison portion 430. The comparison result data on the line 430b is inputted into a P/S shift register 420 via the transmission data selector 419, and converted into a serial data. The comparison result data are encoded by a transmission frame assembling means 421, and then transmitted as a transmission node acknowledge signal via a line 414. The comparison result data on a line 430b is outputted from comparison portion 430 which is generated by comparing 35b with 36b, 35c with 36c, 35d with 36d, 35e with 36e of the communication frame format. In case that the comparison is matched, the comparison result becomes "1". In this example, transmission node acknowledge signal 37 is "1111", since all return data sequence returned from slave nodes match with data in the transmission buffer register.

Operation of the slave node C which receives transmission node acknowledge signal 37 from the master node A is explained using FIG. 9. The reception frame decoding means 323 in the reception control portion 302 transmits the information to the reception control sequence control portion 324 via a line 322a. When the reception control sequence control porion 324 detects the fact that the acknowledge bit b1 assigned to the self node in the transmission node acknowledge signal 37, in this example, is "1", the reception control sequence control porion 324 transmits a control signal, which indicates a normal reception of this reception data, to the control system interface portion 306 via a line 324f.

The control system interface portion 306 outputs data 304c, which are processed by the data from self address register 305, to connection points 306c and 306d as effective in response to the control signal on a line 324f. Where, 306c is logical "L", and 306d is logical "H". As a result, an actuator 390c is not activated, but an actuator 390d is activated in a control system 390 which corresponds to 31. That is, if the actuator 390d is "wiper", for example, the wiper is driven according to the instruction from master node A.

(Embodiment 4)

Figure 12:
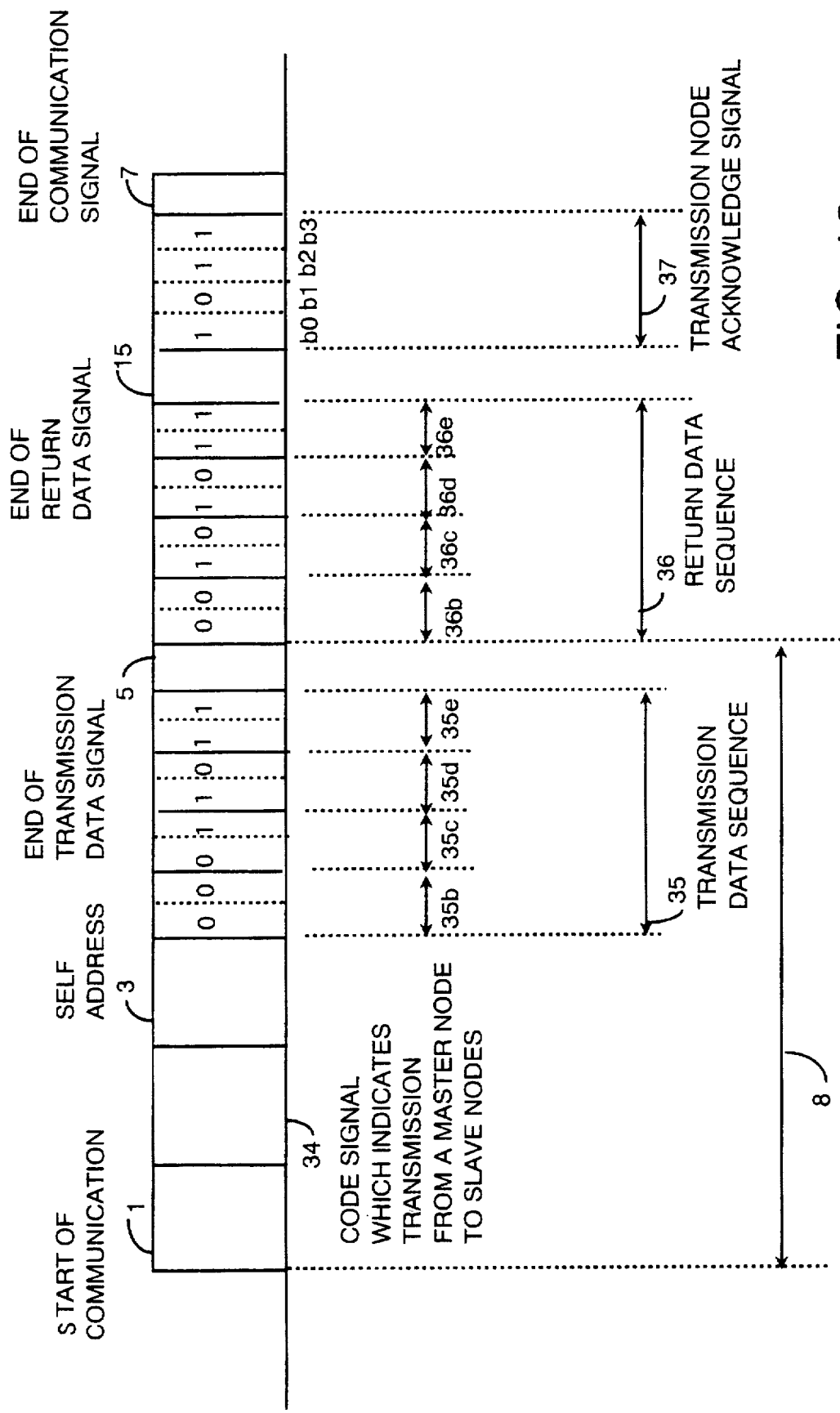
FIG. 12 shows a communication frame format for a fourth embodiment of the present invention.

Although a case in which all slave nodes B, C, D, E do not detect any reception errors in the communication frame of master node A is explained in a third embodiment, the case of a fourth embodiment is explained to a case where some slave node detects the reception errors. FIG. 12 shows a communication frame format used in the fourth embodiment, in which the numerals 1 to 7 are the same as those of in the third embodiment. In this fourth embodiment, one example in which the slave node C detects reception errors in the communication frame is explained.

The return data sequence 36 is divided into areas 36b, 36c, 36d, 36e, which correspond to return data from the slave nodes B, C, D, E. In an example of FIG. 12, the slave node C, which detects errors, returns an inverted reception data in an area which is assigned to the transmission data sequence, and the slave nodes B, D, E, which do not detect any errors, return the reception data itself in areas which are assigned to the transmission data sequence, respectively. Since only node C detects errors in this example, the reception data "01" in the area 35c of the transmission data sequence is inverted into "10" and returned using the return data sequence 36c. Since the nodes B, D, E do not receive any errors, the reception data "00", "10", "11" in the areas 35b, 35d, 35e of transmission data sequence is returned such as "00", "10", "11" without being inverted, respectively, using areas 36b, 36d, 36e. As a result, the data of return data sequence 36 is "00101011".

Figure 13:
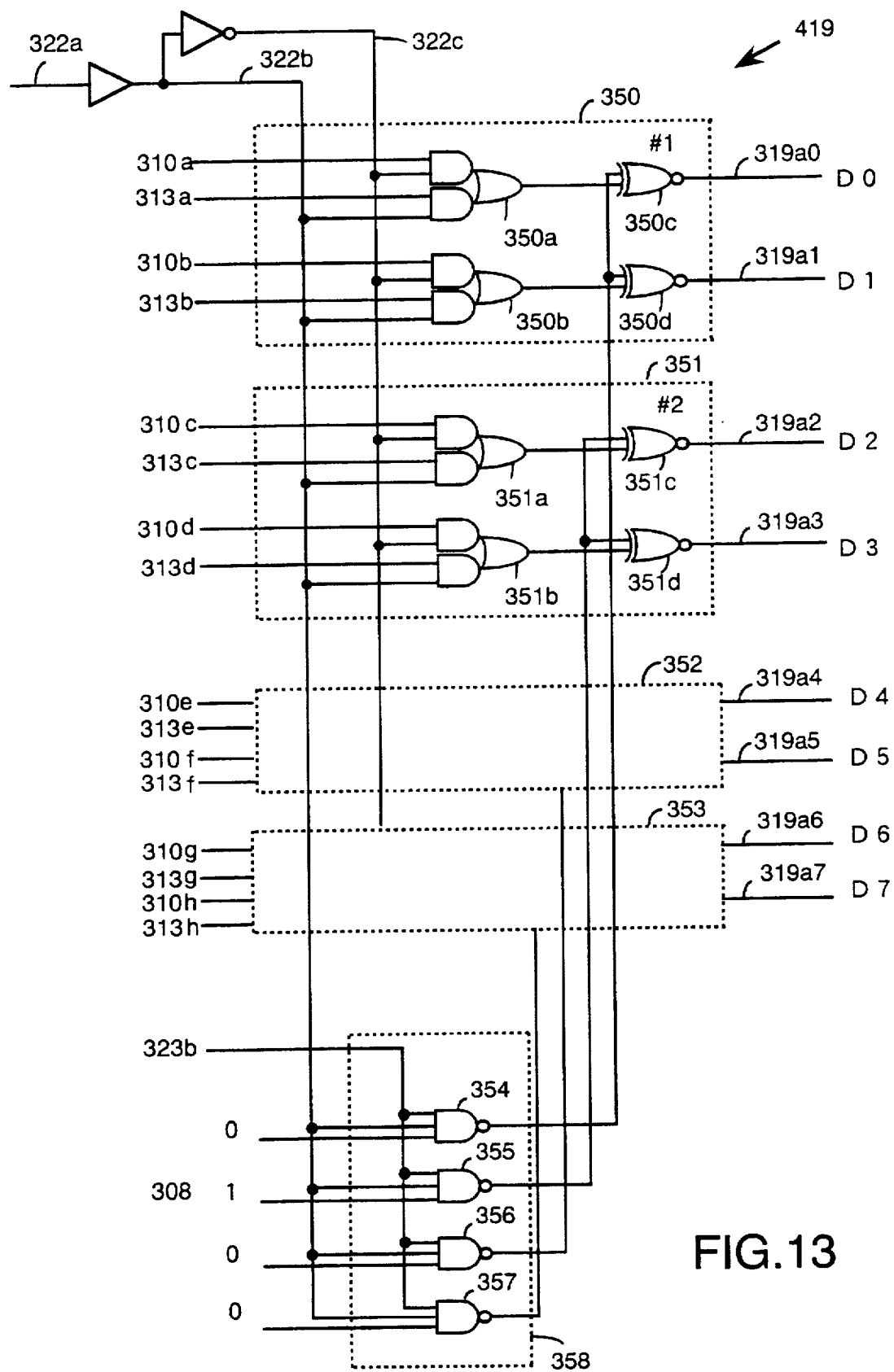
FIG. 13 shows a communication frame format for Embodiment 4 of the present invention.

Detailed operation of slave node C is explained using FIGS. 9 and 13. The reception signal on a line 315 is inputted into a reception frame decoding means 323. As soon as the reception frame decoding means 323 detects the code signal 34 which indicates transmission from the master node to the slave node, the slave node C moves to a reception process. The serial reception data on a line 323b, which is decoded by the reception frame decoding means 323, is inputted into the S/P shift register 325. The reception data on a line 311 converted into parallel data are written in a reception buffer register 304 according to the reception/return buffer writing control signal on a line 324d which is transmitted from reception control sequence control portion 324.

In the self address register 305, data "0100" which indicates the slave node C is set according to a signal on an outside terminal 391. By this data, only area 304c of the reception buffer register 304 is determined to be effective, and the other areas are reset and filled with "0". That is, only data "01" of 35c in the data "00011011" of transmission data sequence 36 in FIG. 8 become effective. At this point, the data stored in the reception buffer register 304 become "000110000".

The reception control sequence control portion 324 receives a signal, which indicates a state of the reception, from reception frame decoding means 323 via line 323a, and then sends control signals to the transmission control portion 301 via lines 324a~324c. The control signal on a line 324a is transmitted when end of transmission data signal 5 in the communication frame is detected. According to this control signal, the transmission control sequence control portion 322 transmits a signal to the transmission data selector 319 via a line 322a. According to this signal, the transmission data selector 319 selects the reception data in reception buffer register 304 via a line 313. The reception frame decoding means 323 sends to transmission data selector 319 via line 323c whether errors are detected in the reception data. In case that errors are detected in this example, the line 323c becomes logical "H". The reception control sequence control portion 324 transmits the return data transmission control signal on a line 324b.

The operation of transmission data selector 319 is explained using FIG. 13, in case that signal 323c is inputted, which indicates that the reception errors are detected. Transmission data selectors 0, 1, 2, 3 indicated by the numerals 350, 351, 352, 354 in the transmission data selector portion 319 are completely the same type, and thus their operation is explained using the transmission data selector 1 shown in block 351. A data bit D2 of the transmission buffer register, a data bit D2 of the reception buffer register, and a reception signal buffer select signal on line 322b are inputted into 2AND-OR gate 351a in transmission data selector #1. During the return data sequence, the control signal on the line 322a is logical "H", and a reception buffer select signal 322b is logical "H", and a transmission buffer select signal 322c is logical "L", and the data of data bit D2 of the reception buffer register 304 is outputted from 2AND-OR gate 351a. The output signal is inputted into EX-NOR gate 351c on a succeeding stage. The another input of EX-NOR gate is connected to an output of NAND gate 355 in a inverse control portion 358. In case that this output signal is "H", the data of 351a from EX-NOR gate is outputted to line 319a$_2$ as it is, and inverted data of 351a is outputted in case that the output signal is "L". That is, in case that the input signal into the EX-NOR gate 351a from NAND gate 355 in the inverse control portion 358 is "H", the data of data bit D of the reception buffer register is outputted to the line $319a_2$ as it is, and in case that the input signal is "L", the inverted data are outputted to the line $319a_2$. Operation of 351b and 351d in transmission data selector #1 are the same as explained above, and in case that the output of NAND gate 355 is "H", that is, the data of data bit D3 of the reception buffer register is outputted to a line $319a_3$ as it is, and in case that the output of NAND gate 355 is "L", the inverted data are outputted.

In the inverse control portion 358, data "0100" of the self address register 305 are inputted via a line 308, and the outputs of NAND gates 354, 356, 357 are always to be "H". That is, the data of data bits D0, D1, D4, D5, D6, D7 in the reception buffer register 304 are outputted in lines $319a_0$, $319a_1$, $319a_4$, $319a_5$, $319a_6$, $319a_7$ as they are. In case that the reception error select signal on the line 323b is "H" (during detecting errors), the output of NAND gate 355 in the inverse control portion becomes "L", and thus inverted data of data bits D2, D3 in the reception buffer register 304 is outputted from the lines $319a_2$ and $319a_3$. In this example, since data D0~D7 in the reception buffer register is "000010000", the outputs D0~D7 of transmission data selector become "00100000", where bits D2 and D3 is reversed.

In case that the transmission buffer select control signal on the line 322a is "L", the transmission buffer select signal 322c becomes "H", and the reception buffer select signal 322c becomes "L". Further, all outputs of inverse control portion 358 are "H", then data D0~D7 of transmission buffer register 303 is outputted as they are.

Outputs data D0~D7 "00100000" of the transmission data selector to be returned are inputted into the P/S shift register 320 as return data, and then converted into serial data. Then, they are encoded by the transmission frame assembling means 321 as return data, and transmitted via line 314 as return data sequence. At this time, the data sequence "00100000" is returned from the node C.

Since the other slave nodes B, D, E do not detect any errors in this embodiment, the return data sequence "00000000", "00001000", "00000011" are returned from the respective nodes. Since these return data sequence "00000000", "00001000", "00000011" are superposed, the return data sequence on the bus line becomes "00101011" as shown in the return data sequence 36 in FIG. 12.

Operation of the master node A which receives the return data sequence 36 is explained using FIG. 11. In the master node A, the return data sequence 36 is inputted into the reception frame decoding means 402 as the reception signal. The serial return data on line 423b which are decoded by the reception frame decoding means 423 are inputted into the S/P shift register 425. The return data on the line 411 converted into the parallel data are written into the return data buffer register 427 according to the return buffer writing control signal on the line 426b from the reception control sequence control portion 424. After all return data are written into the return data buffer register 427, the comparison portion 430 compares the data in the return data buffer register 427 with the data in the transmission buffer register 403 via lines 428 and 429, respectively. Then the comparison portion 430 transmits a comparison termination signal to the reception control sequence control portion 424 via a line 430a.

When the comparison termination signal is transmitted, the reception control sequence control portion 424 transmits a transmission acknowledge signal to the transmission control sequence control portion 422 via the line 424c. When receiving this transmission acknowledge signal, the transmission control sequence control portion 422 transmits a signal to line 422a so that the transmission data selector 419 selects comparison result data on the line 430b from the comparison portion 430. The comparison result data 430b inputted into the P/S shift register 425 via transmission data selector 419, and then converted into serial data. The comparison result data are encoded by the transmission frame assembling means 421 and transmitted as a transmission node acknowledge signal via a line 414. The comparison result data on a line 430b is outputted from comparison portion 430 which is generated by comparing 35b with 36b, 35c with 36c, 35d with 36d, 35e with 36e of the communication frame format as shown in FIG. 12. In case that the comparison is matched, the comparison result becomes "1". In this example, transmission node acknowledge signal 37 from the master node becomes "1011", since 35c does not match with 36c.

Operation of the slave node C which receives transmission node acknowledge signal 37 from the master node A is explained using FIG. 9. The reception frame decoding means 323 in the reception control portion 302 transmits received transmission node acknowledge signal 37 to the reception control sequence control portion 324 via a line 322a. When the reception control sequence control porion 324 detects the fact that the acknowledge bit b1 assigned to the self node in the transmission node acknowledge signal 37, in this example, is "0", the reception control sequence control porion 324 transmits a control signal, which indicates a non-normal reception of this reception data, to the control system interface portion 306 via a line 324f. The control system interface portion 306 allows data 304c, which are processed by the data from self address register 305, to be non-effective in response to the control signal on a line 324f.

(Embodiment 5)

Figure 14:
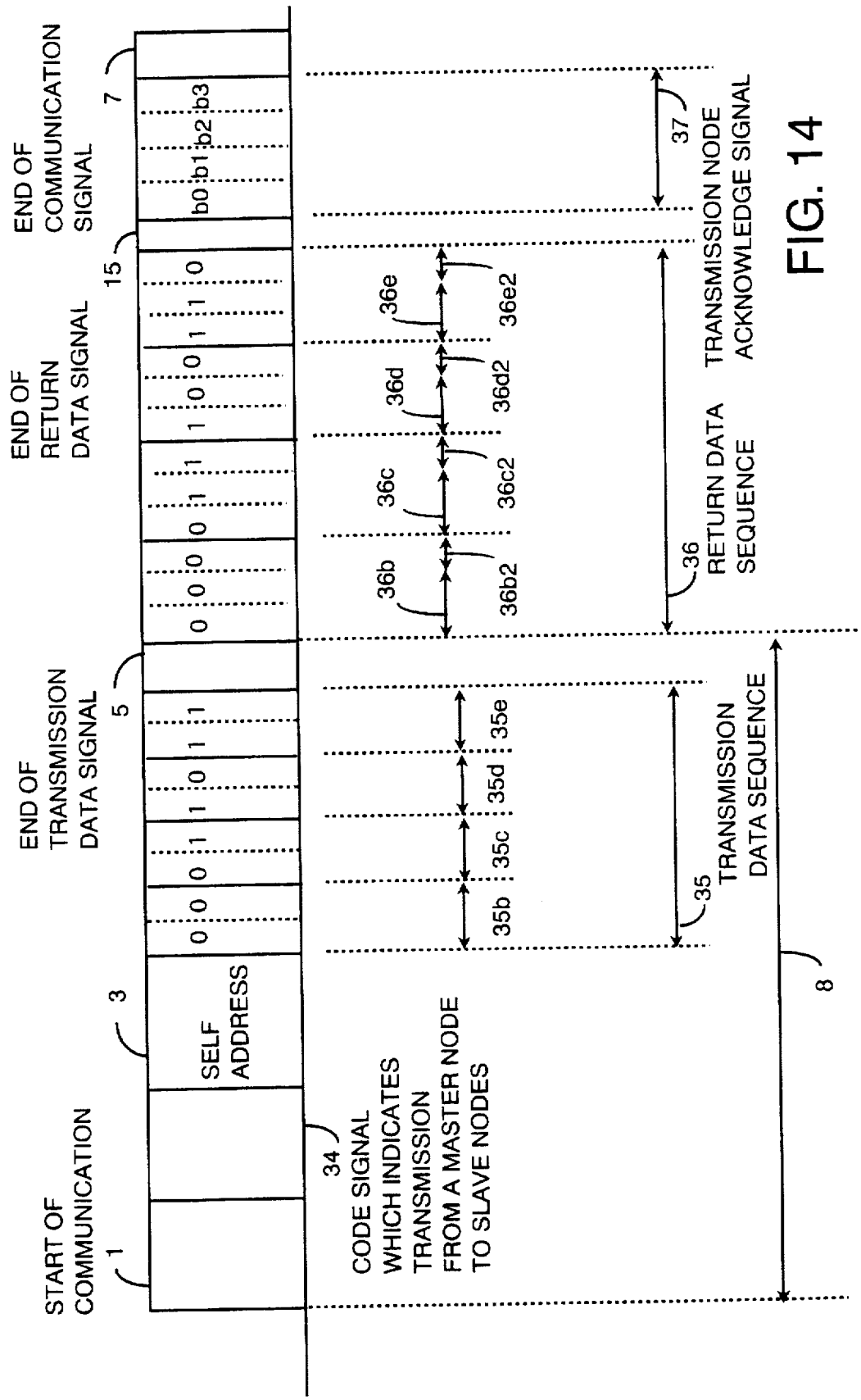
FIG. 14 shows a communication frame format for a fifth embodiment of the present invention.

An example of the fourth embodiment is explained, where the slave node returns an inverted reception data to the reception process area assigned to the transmission data sequence if it detects errors in the return data sequence, and the slave node returns reception data itself to the reception process area assigned to the transmission data sequence if it does not detects any errors. However, in a fifth embodiment, a system is explained, where a communication frame format shown in FIG. 14 includes a return data sequence 36 added by one bit which indicates errors returned from each slave node. In a communication frame format in the fifth embodiment, an example, where only the slave node C detects errors is shown. In the return data sequence 36 in FIG. 14, a bit $36c_2$ having the value of logical "1" is added after the transmission data sequence "01". Other bits $36b_2$, $6d_2$, $36e_2$ in FIG. 14 are filled logical "0" since the other slave nodes B, D, E do not detect errors in the received transmission data sequence. As a result, the return data sequence is becomes "000011100110" as shown in the return data sequence 36.

Figure 15:
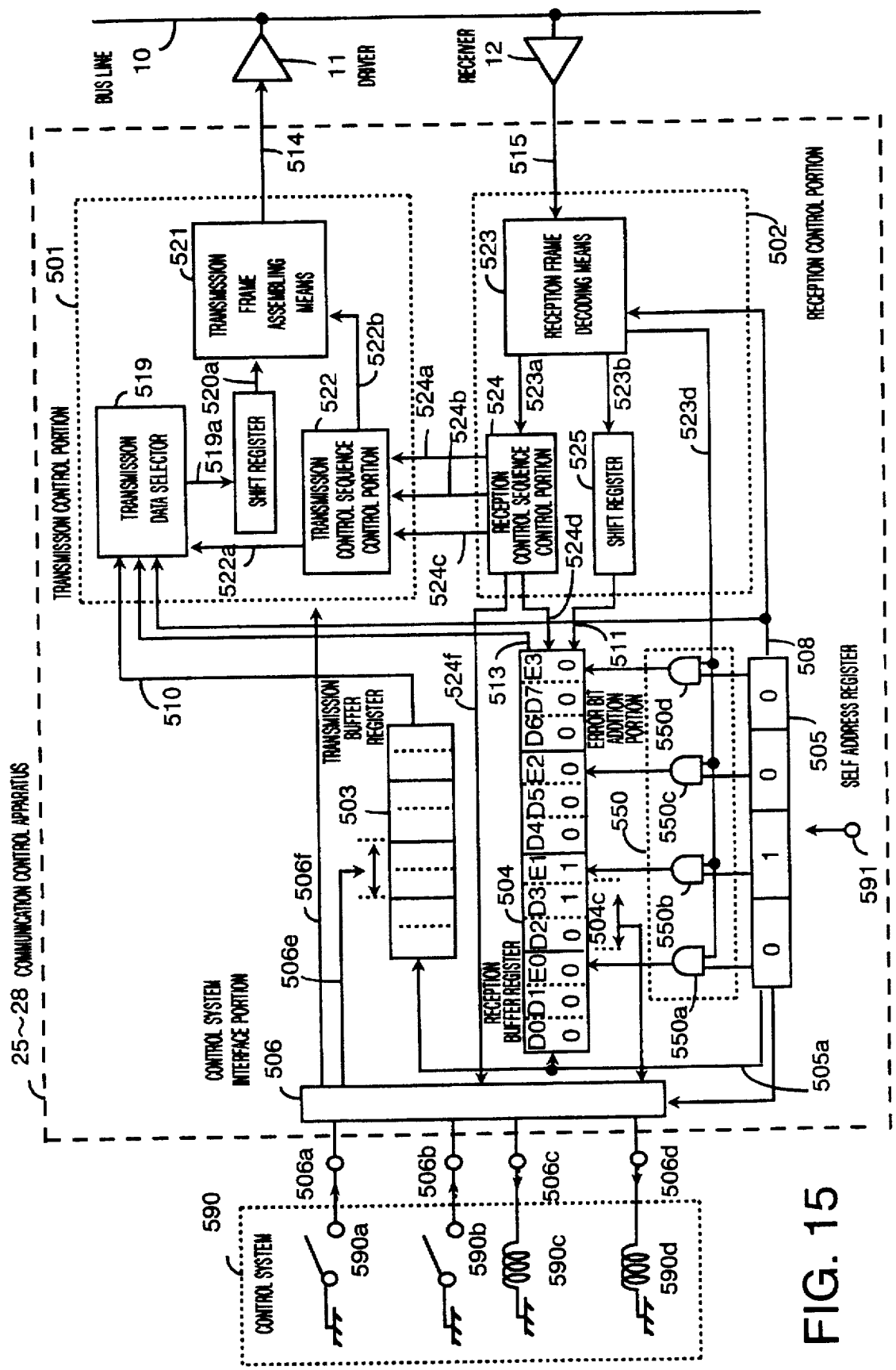
FIG. 15 shows a communication control apparatus 25-28 of the slave node for a fifth embodiment (slave node C).

FIG. 15 shows a construction of a communication control apparatus of the slave node of a fifth embodiment. Here, a slave node C on the LAN system in FIG. 7 is explained as a concrete example. A control system 590 (31 in FIG. 7) of slave node C comprises switches 590a, 590b and actuators 590c, 590d. These are connected to control system interface portion 506 via lines 506a, 506b, 506c, 506d, respectively.

Operation of a slave node C is explained using FIG. 15, which receives the communication frame from master node A. Reception signal 515 is inputted into reception frame decoding means 523. When the reception frame decoding means 523 detects a code signal 34 which indicates transmission from master to slave, the reception process starts. The serial reception data on a line 523b decoded by the reception frame decoding means 523 is inputted into an S/P shift register 525. The reception data on a line 511 converted into parallel data are written in areas D0-D7 in a reception buffer register 504 according to a reception buffer writing control signal on a line 524d which is transmitted from the reception control sequence control portion 524.

Data "0100" which indicates slave node C are set in a self address register 505 in response to a signal on an outside terminal 591. Each bit of data"0100" in the self address register 505 corresponds to slave nodes B, C, D, E, respectively. As easily understood from FIG. 15, only the second bit is set "1" since FIG. 15 shows a construction of the slave node C. According to this data, only areas (D2, D3) indicated by the numeral 504c in the reception buffer register 504 are allowed to be effective, and other areas (D0, D1, D4-D7) are allowed to be in a reset state (that is, "0"). That is, only "01" portion corresponding to the part of 35c in the data "00011011" of the transmission data sequence 35 in FIG. 14 is allowed to be effective. At this point, data D0-D7 stored in the reception buffer register 504 become "00010000". In case that reception errors are detected at the reception frame decoding means 523, a state on a line 523d becomes logical "H".

The line 523d is connected to respective AND gates 550a, 550b, 550c, 550d in an error bit addition portion 550. The other output of AND gate is connected to respective bits of the self address register 505. Here, since the data of the self address register 505 is "0100", outputs E0, E2, E3 of the error bit addition portion 550 are fixed to "0". In case that reception errors are detected at the reception frame decoding means 523, the state on the line 523d becomes logical "H". Therefore, output EI of AND gate 550b becomes logical "1". Accordingly, data of the reception buffer register 504 including the error bits become "000011000000".

The reception control sequence control portion 524 receives a signal, which shows a state of the reception signal, from reception frame decoding means 523 via a line 523a, and sends a control signal to the transmission control sequence control portion 522 via lines 524a-524c. The control signal on the line 524a is transmitted when end of transmission data signal 5 of the communication frame is detected. When receiving this signal, the transmission control sequence control portion 522 transmits the control signal to the transmission data selector 519 via a line 522a so that the transmission data selector 519 selects the reception data on a line 513, in which error bits are added to the data of the reception buffer register 504. The reception control sequence control portion 524 transmits a return data transmission control signal to the transmission control sequence control portion 522 via the line 524b. The reception data on the line 513 is inputted into the P/S shift register as return data by the transmission data selector 519, and then converted into serial data. The transmission frame assembling means 521 transmits the return data sequence, which are encoded as return data, to the bus line 10 via a line 514. At this time, the return data sequence which the node C returns is "000011000000".

The other slave nodes B, D, E perform in the same way as explained above. That is, the node B causes the area 35b of the transmission data sequence to be effective reception data, and node D causes the area 35d of the transmission data sequence to be effective reception data, and node E causes the area 35e of the transmission data sequence to be effective reception data. The data sequence to be returned is "000000000000" for node B,"000000100000" for node D, and "000000000110" for node E, as shown in FIG. 10. Bus line 10 of each node is connected by wired OR logic, the return data sequence 36 on the bus line 10 is "000011100110" as shown in FIG. 14.

Figure 16:
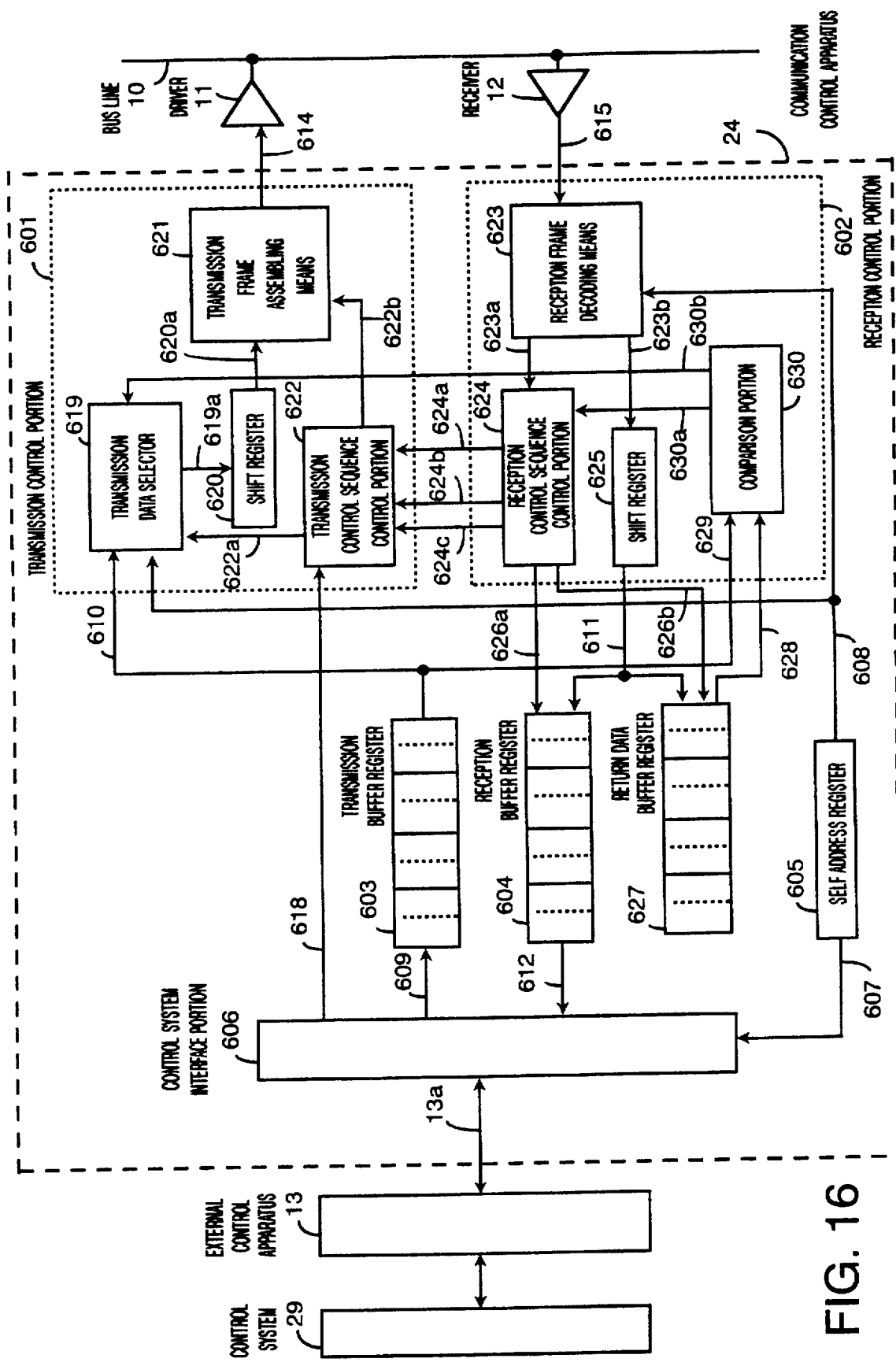
FIG. 16 shows a communication control apparatus 24 of the master node for a fifth embodiment.

Operation of the master node A which responds to received return data sequence 36 is explained below using FIG. 16. In the master node A, the received return data sequence 36 is inputted into a reception frame decoding means 623 as a reception signal. The serial return data on a line 623b which is decoded by the reception frame decoding means 623 is inputted into a P/S shift register 625. Then, the return data on a line 611 converted into a parallel data are written into a return data buffer register 627 according to a return buffer writing control signal on a line 626b outputted from the reception control sequence control porion 624. After all return data are written in the return data buffer register 627, the comparison portion 630 compares data in the return data buffer register 627 with data in the transmission buffer register 603 via lines 628 and 629, respectively. Then, the comparison portion 630 transmits the comparison termination signal to the reception control sequence control portion 624 via a line 630a.

The data in the return data buffer register 627 to be compared here are D0-D7, and error bits E0-E3 are not included. When receiving the comparison termination signal, the reception control sequence control portion 624 transmits a transmission acknowledge signal to the transmission control sequence control portion 622 via a line 624c. According to this transmission acknowledge signal, the transmission control sequence control portion 622 transmits the control signal via a line 622a to the transmission data selector 619 so that the transmission data selector 619 selects the data on a line 630b from the comparison portion 630. The comparison result data on the line 630b is inputted into a P/S shift register 620 via the transmission data selector 619, and converted into a serial data. The comparison result data are encoded by a transmission frame assembling means 621, and then transmitted as a transmission node acknowledge signal via a line 614. The comparison result data on a line 630b is outputted from comparison portion 430 which is generated by comparing 35b with 36b, 35c with 36c, 35d with 36d, 35e with 36e of the communication frame format as shown in FIG. 14. In case that the comparison is matched, the comparison result becomes "1". That is, although this transmission node acknowledge signal sequence 36 detects errors in the receiving-side slave node, the return data sequence matches with the transmitting data sequence which is sent from the master node. Therefore, the slave node C may process this reception data as effective.

Operation of the slave node C which receives transmission node acknowledge signal 37 from the master node A is explained using FIG. 15. The reception frame decoding means 523 in the reception control portion 502 transmits the information of transmission node acknowledge signal 37 to the reception control sequence control portion 524 via a line 523a. When the reception control sequence control porion 524 detects the fact that the acknowledge bit b1 assigned to the self node in the transmission node acknowledge signal 37, in this example, is "1", the reception control sequence control porion 524 transmits a normal reception control signal, which indicates that errors are detected but the reception data are effective, to the control system interface portion 506 via a line 524f.

The control system interface portion 506 outputs data 504c, which are processed by the data from self address register 505, to connection points 506c and 506d as effective in response to the control signal on a line 524f. Where, 506c is logical "L", and 506d is logical "H". As a result, an actuator 590c is not activated, but an actuator 590d is activated in a control system 590.

(Embodiment 6)

Figure 17:
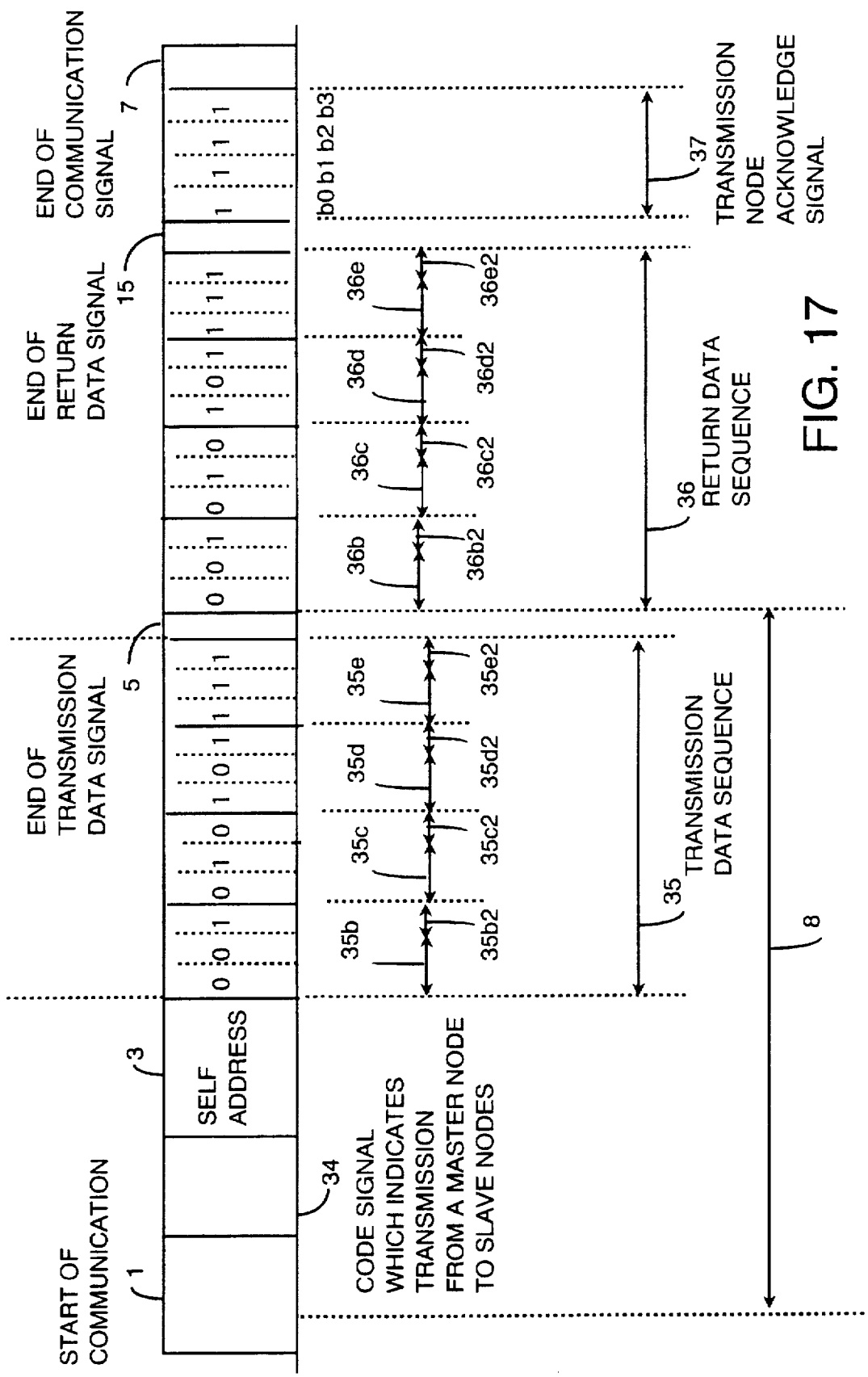
FIG. 17 shows a communication frame format for a sixth embodiment of the present invention.

FIG. 17 shows a communication frame format for a sixth embodiment of the present invention. This communication frame format comprises a start of communication signal 1 which indicates start of communication, a code signal 34 which indicates transmission from a master node to slave nodes, a self address 3 which indicates an origin of transmission, that is master node, a transmission data sequence 35 which indicates area of data to communicate, an end of transmission data signal 5 which indicates termination of transmission data, a return data sequence 36 which the receiving-side returns to the transmitting-side in case that the receiving-side detects no errors in the signals received from the transmitting-side, an end of return data signal15 which indicates termination of the return data sequence, a transmission node acknowledge signal 37 and an end of communication signal 7 which indicates termination of the communication frame. The transmitting-side transmits the signals using areas 8 and 37. Area 36 is used so that the receiving-side transmits signals. In the system of a sixth embodiment, the master node A transmits the communication frame, and all slave nodes B, C, D, E receive the communication frame for processing.

The transmission data sequence 35 comprise areas 35b, 35c, 35d, 35e, and areas of effective /non-effective bits 35b$_2$, 35c$_2$, 35d$_2$, 35e$_2$ which make these data effective or non-effective. Each return data sequence corresponds to area of respective return data of slave nodes B, C, D, E, respectively, which returns the reception data itself to the transmission data sequence. That is, the return data sequence 36 is the same as the transmission data sequence 35. The transmission node acknowledge signal 37 is an acknowledge signal which is sent from the transmission node to the reception node in case that the return data sequence 36 and the transmission data sequence 35 match at the transmitting-side.

Figure 19:
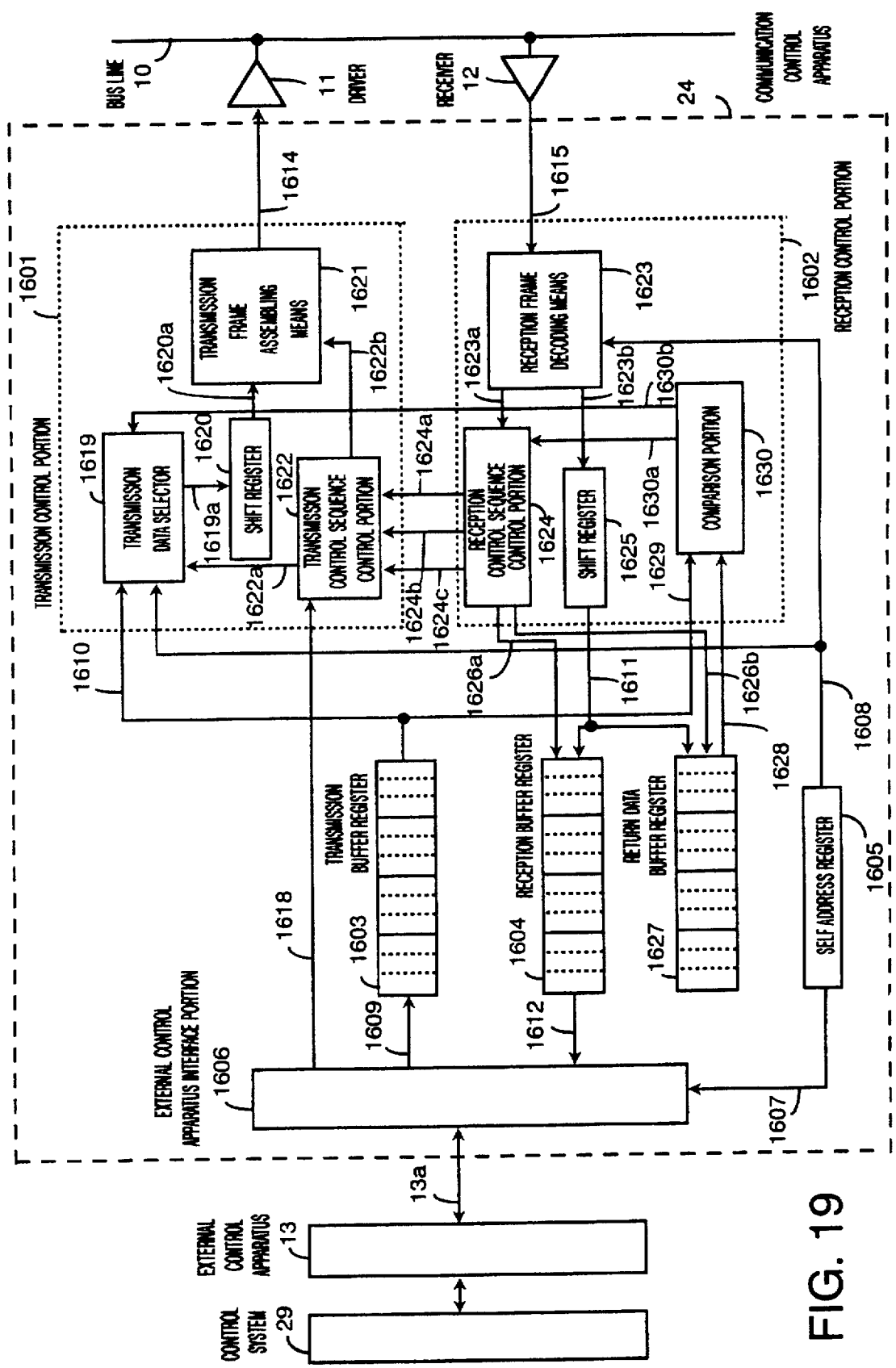
FIG. 19 shows a communication control apparatus 24 of the master node for a sixth embodiment.

First, transmission operation of the master node A is explained in detail using FIG. 19. The transmission data sent from the external control apparatus 13 is written into the transmission buffer register 1603 via an external control apparatus interface portion 1606. Here, the transmission data to be written in the transmission buffer register 1603 are 35b, 35b$_2$, 35c, 35c$_2$, 35d, 35d$_2$, 35e, 35e$_2$ in the transmission data sequence as shown in FIG. 17. In the sixth embodiment, an example is explained where data "001010101111" which are contents of the transmission data sequence (35b, 35b$_2$, 35c, 35c$_2$, 35d, 35d$_2$, 35e, 35e$_2$) are written. In the present sixth embodiment, "1" means an effective bit, and "0" means a non-effective bit for the effective/non-effective bits 35b$_2$, 35c$_2$, 35d$_2$, 35e$_2$ mentioned above.

After completing the writing, the external control apparatus interface portion 1606 transmits the communication buffer full signal which indicates completion of writing to a communication control sequence control portion 1622 via a line 1618. When receiving this transmission buffer full signal, the transmission control portion 1601 is activated. The transmission data selector 1619 selects transmission data on a line 1610 received from the transmission buffer register 1603 in response to the selector control signal on a line 1622a, and transmits it to a P/S shift register 1620 via a line 1619a. The transmission data converted into the serial data are inputted into the transmission frame assembling means 1621 from the P/S shift register 1620 via a line 1620a. The transmission frame assembling means 1621 assembles a communication frame by adding the start of communication signal 1 and the code signal 34, which indicates the transmission from a master node to slave nodes and so on, to the inputted transmission data, and then transmits it to a bus line 10 via a line 1614 as a transmission signal.

Figure 18:
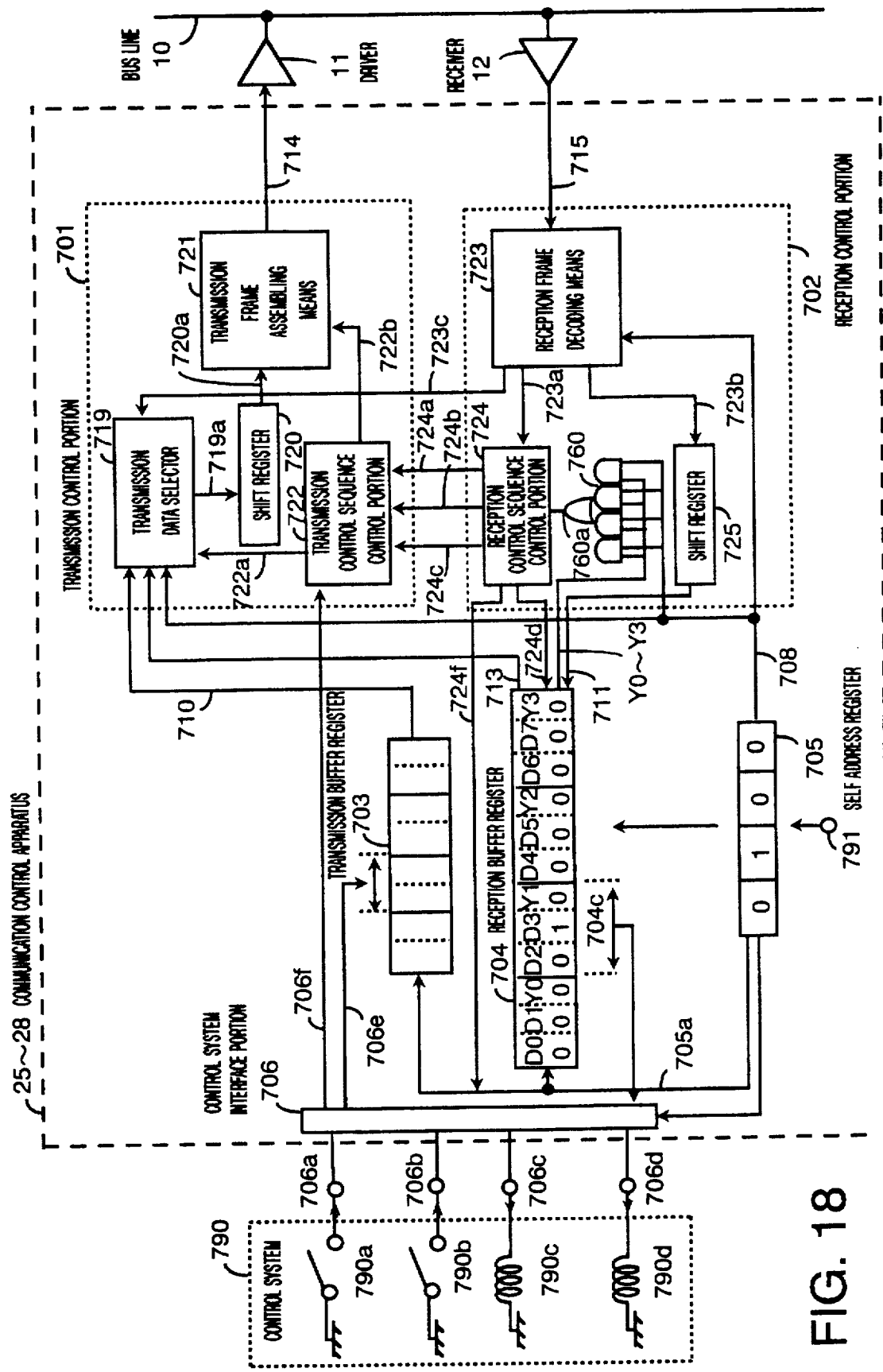
FIG. 18 shows communication control apparatus 25-28 of the slave node for a sixth embodiment of the present invention (slave node C).

FIG. 18 shows a construction of communication control apparatus 25~28 of the slave node of the sixth embodiment of the present invention. Here, an operation of the slave node C is explained. In FIG. 18, the reception signal on a line 715 is inputted into a reception frame decoding means 723. In case that the reception frame decoding means 723 detects a code signal 34 which indicates transmission from master to slave, reception process starts. The serial reception signal on a line 723b decoded by the reception frame decoding means 723 is inputted into a S/P shift register 725. The reception data on a line 711 converted into the parallel data are written into a reception buffer register 704 according to a reception buffer writing control signal on a line 724d which is transmitted from the reception control sequence control portion 724.

Data "0100" are set which indicates the slave node C in self address register 705 according to a signal on an outside terminal 791. According to this data, the reception buffer register 704 makes only an area 704c effective, and makes the remaining areas reset. That is, only data "010" is effective which corresponds to portions 35c and 35c$_2$ of data "001010101111" in the transmission data sequence 35 in FIG. 17, and the other portions 35b, 35b$_2$, 35d, 35d$_2$, 35e, 35e$_2$ are filled with "0". Therefore, the data stored in the reception buffer register 704 is "000010000000". Data Y0~Y3 which indicate effective/non-effective for the data stored in the reception buffer register 704 and the data in the self address register 791 are inputted into effective/non-effective detection portion 760. In this embodiment, since the data of Y0~Y3 are "0000", an output from effective/non-effective detection portion 760 is "0". Therefore, a signal which indicates non-effective data is outputted on a line 760a, and inputted into the reception control sequence control portion 724.

The reception control sequence control portion 724 receives a signal which indicates a state of the reception signal from the reception frame decoding means 723 on a line 723a, and transmits a control signal to the transmission control sequence control portion 722 of the transmission control portion 701 via lines 724a~724c. When the reception frame decoding means 723 detects an end of transmission data signal 5 in the communication frame, the reception control sequence control portion 724 transmits the control signal on a line 724a. According to this control signal, the transmission control sequence control portion 722 transmits a control signal on a line 722a to a transmission data selector 719 to select the reception data in reception buffer register 704 via a line 713. The reception control sequence control portion 724 transmits a return data transmission control signal via a line 724b. The reception data on a line 713 is inputted into the P/S shift register 720 via transmission data selector 719 as the return data, and converted into the serial data. This serial data are encoded as the return data by the transmission frame assembling means 721, and transmitted as the return data sequence via a line 714. The data sequence returned from node C at this time is "000010000000".

The other slave nodes B, D, E perform in the same way as explained above. That is, the node B causes the area 35b of the transmission data sequence to be effective reception data, and node D causes the area 35d of the transmission data sequence to be effective reception data, and node E causes the area 35e of the transmission data sequence to be effective reception data. The data sequence to be returned is "001000000000" for node B, "00000010100" for node D, and "000000000111" for node E. Since the bus line 10 is connected wired OR logic, the return data sequence 36 which master node A returns is "001010101111".

An operation of master node A which responds to received return data sequence 36 is explained below using FIG. 19. FIG. 19 shows a construction of a communication control apparatus 24 of the master node A of the sixth embodiment. In the master node A in FIG. 19, the received return data sequence 36 is inputted into a reception frame decoding means 1623 as a reception signal. The serial return data on a line 1623b which is decoded by the reception frame decoding means 1623 is inputted into a P/S shift register 1625. Then, the return data on a line 1611 converted into a parallel data are written into a return data buffer register 1627 according to a return buffer writing control signal on a line 1626b outputted from the reception control sequence control porion 1624. After all return data are written in the return data buffer register 1627, the comparison portion 1630 compares data in the return data buffer register 1627 with data in the transmission buffer register 1603 via lines 1628 and 1629, respectively. Then, the comparison portion 1630 transmits the comparison termination signal to the reception control sequence control portion 1624 via a line 1630a.

When receiving the comparison termination signal, the reception control sequence control portion 1624 transmits a transmission acknowledge signal to the transmission control sequence control portion 1622 via a line 1624c. According to this transmission acknowledge signal, the transmission control sequence control portion 1622 transmits the control signal via a line 1622a to the transmission data selector 1619 so that the transmission data selector 1619 selects the data on a line 1630b from the comparison portion 1630. The comparison result data on the line 1630b is inputted into a P/S shift register 1620 via the transmission data selector 1619, and converted into a serial data. The comparison result data are encoded by a transmission frame assembling means 1621, and then transmitted as a transmission node acknowledge signal via a line 1614 and the bus line 10.

The comparison result data on a line 1630b is outputted from comparison portion 1630 which is generated by comparing (35b+35$b_2$) with (36b+36$b_2$), (35c+35$c_2$) with (36c+36$c_2$), (35d+35$d_2$) with (36d+36$d_2$), (35e+35$e_2$) with (36e+36$e_2$) of the communication frame format. In case that the comparison is matched, the comparison result becomes "1". In this example, transmission node acknowledge signal 37 is "1111", since all return data sequence returned from slave nodes match with data in the transmission buffer register.

Operation of the slave node which receives transmission node acknowledge signal 37 from the master node A is explained using FIG. 18. In FIG. 18, the reception frame decoding means 723 in the reception control portion 702 transmits the information to the reception control sequence control portion 724 via a line 723a. The reception control sequence control porion 724 detects the fact that the acknowledge bit b1 assigned to the self node in the transmission node acknowledge signal 37, in this example, is "1". But, a non-effective signal detected at effective/non-effective detection portion 760 is inputted into the reception control sequence control portion 724. Therefore, the control signal on the line 724f which indicates normal reception of this reception data is not sent to the control system interface portion 706. Accordingly, this communication data are non-effective, and the control system 790 connected to the control system interface 706 remains in state before communication.

(Embodiment 7)

Figure 20:
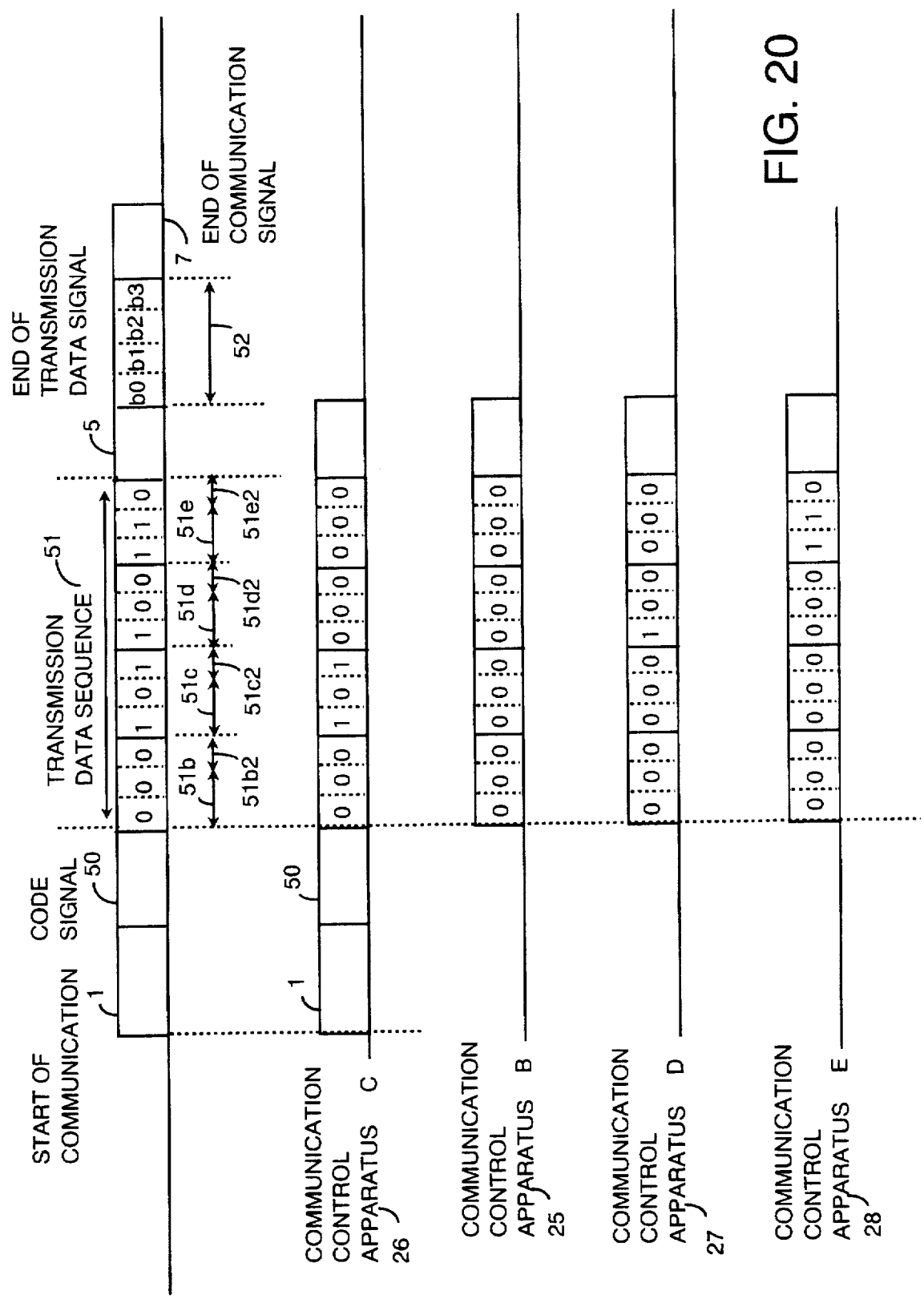
FIG. 20 shows a communication frame format used when the slave node for a seventh embodiment of the present invention transmits.

Transmission of the slave node of the present invention is explained in a seventh embodiment. FIG. 20 shows a communication frame format used when the slave node of the seventh embodiment transmits. This communication frame format comprises a start of communication signal 1 which indicates start of communication, a code signal 50 which indicates transmission from slave nodes to a master node, a transmission data sequence 51 which indicates areas of data to communicate, an end of transmission data signal 5 which indicates termination of transmission data, an acknowledge signal 52 which master node returns, and an end of communication signal 7 which indicate termination of communication frame.

The transmission data sequence 51 in FIG. 20 is divided into areas 51b, 51c, 51d, 51e, 51$b_2$, 51$c_2$, 51$d_2$, 51$e_2$, and respective data correspond to the return data from slave nodes B, C, D, E. The acknowledge signal 52 of the master node A has a plurality of areas which is assigned to each slave node. In this example, acknowledge signals b0, b1, b2, b3 are transmitted to nodes B, C, D, E, respectively.

Figure 21:
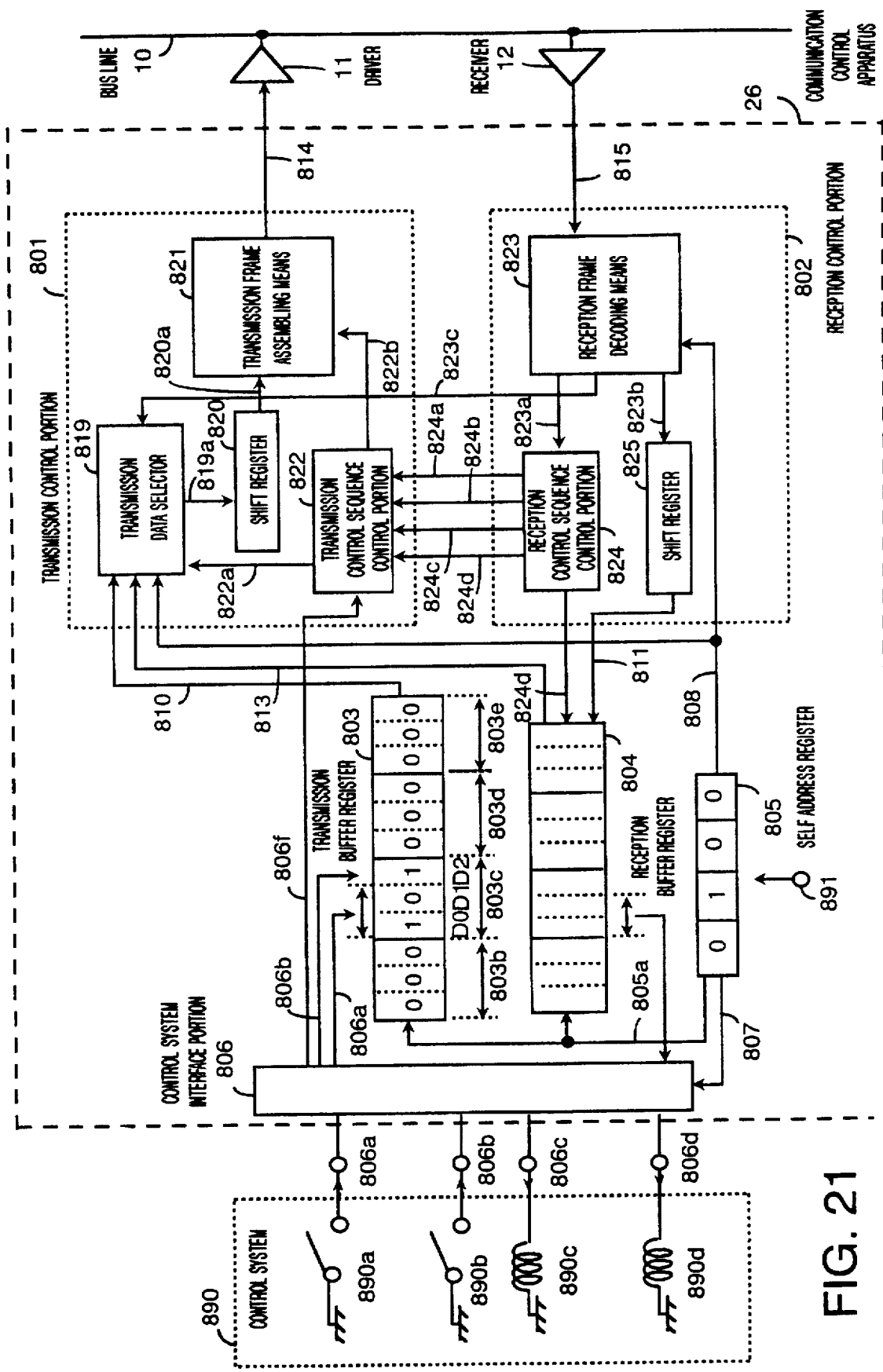
FIG. 21 shows communication control apparatus 25-28 of the slave node for a seventh embodiment of the present invention (slave node C).

Operation is explained below using FIGS. 20 and 21 in case that slave node C in FIG. 7 starts transmission to the master node A. FIG. 21 shows a construction of the communication control apparatus 26 of slave node C of the seventh embodiment of the present invention. A control system 890 of the slave node C comprises switches 890a, 890b and actuators 890c, 890d. These are connected to control system interface portion 806 via lines 806a, 806b, 806c, 806d, respectively.

A transmission operation is explained in case that a switch 890a of the control system of slave C is turned on. Information that the switch 890a is turned on is inputted into the control system interface portion 806 via a line 806a. According to this information, the control system interface portion 806 writes the transmission data into a transmission buffer register 803. ON/OFF states of the switch 890a and 890b are written into areas D0 and D1, respectively, and a state that the switch turns or not is written into area D2. In this example, D0=1 and D1=0 because the switch 890a is in On state, and the switch 890b is n OFF state, and D2=1 because the state of switch 890a is changed from OFF to ON. Here, data "0100" of the self address register 805 is inputted into the transmission buffer register 803 via a line 805a. As shown in FIG. 21, areas 803b, 803d, 803e in the transmission buffer register 803 are reset and filled with "0". Data can be written into only an area 803c. After writing the transmission data into the transmission buffer register 803, the control system interface portion 806 transmits a transmission buffer full signal, which indicates completion of writing the transmission data, to a transmission control sequence control portion 822 via a line 806f.

When receiving this signal, the transmission control portion 801 is activated. Transmission data selector 819 selects transmission data on a line 810 which are transmitted from the transmission buffer register 803 according to the selector control signal on a line 822a. The selected transmission data are inputted into a P/S shift register 820 via a line 819a. The transmission data converted into serial data by the P/S shift register 820 are inputted into a transmission frame assembling means 821 via a line 819a. The transmission frame assembling means 821 assemble a communication frame by adding the start of communication signal 1 and the code signal 50, which indicates slave transmission, and so on, to the input transmission data, and transmits it to the bus line 10 via a line 814. At this time, the transmission data sequence which is transmitted from the slave node C is "000101000000" as shown in 26 of FIG. 20.

Figure 22:
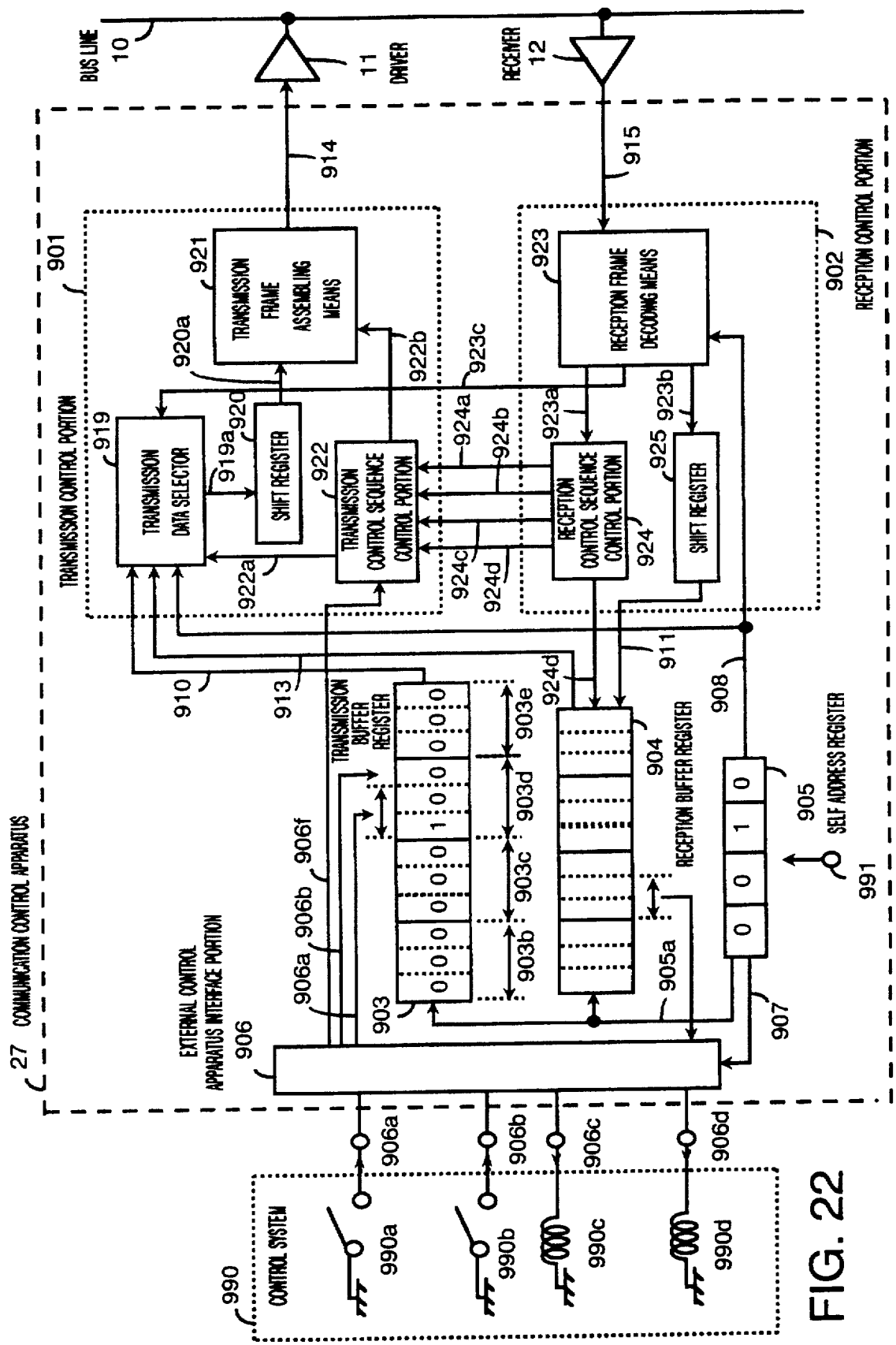
FIG. 22 shows communication control apparatus 25-28 of the slave node for a seventh embodiment of the present invention (slave node D).

Operation of a node other than node C, for example, a slave node D, is explained below using FIG. 22. In the slave node D, for example, a switch 990a is in ON state, and a switch 990b is in OFF state, and this state is already communicated to the master node A. Therefore, an area 903d of transmission buffer register 903 is set to "100". Areas of 903b, 903c, 903e are reset and filled with "0", since data in the self address register 905 is "0010". Accordingly, the data in transmission buffer register 903 is "000000100000" as shown in 27 of FIG. 20.

The communication frame transmitted from the slave node is inputted into reception frame decoding means 923 of the slave node D as a reception signal via a line 915. When detecting the code signal 50 which indicates the slave transmission, the reception frame decoding means 923 transmits this information to a reception control sequence control portion 924 via a line 923a. The reception control sequence control portion 924 activates the transmission control sequence control portion 922 via a line 924d. According to the selector control signal on the line 922a which is transmitted from the transmission control sequence control portion 922, the transmission data selector 919 selects transmission data on a line 910 which is transmitted from the transmission buffer register 903. The transmission data selector 919 transmits the transmission data to the P/S shift register 920 via a line 919a. The P/S shift register 922 transmits the transmission data converted into serial data to the transmission frame assembling means 921 via a line 920a. The transmission frame assembling means 921 assembles a communication data according to the inputted transmission data, and transmits it to the bus line 10 as a transmission signal via a line 914. At this time, the transmission data sequence which is transmitted from the slave node D is "000000100000" as shown in 27 of FIG. 20.

Operation of slave nodes B, E is the same as that of slave node D. Supposing that both switches 990a, 990b of the slave node B are turned off, and both switches 990a, 990b of the slave node E are turned on (not shown), transmission data sequence 51 which are transmitted from the slave nodes B, E become "000000000000", "000000000110", as shown in 25 and 28 of FIG. 20. Since the bus line 10 is connected wired OR logic, the transmission data sequence on the bus line 10 becomes "000101100110", as shown by transmission data sequence 51 in FIG. 20.

Figure 23:
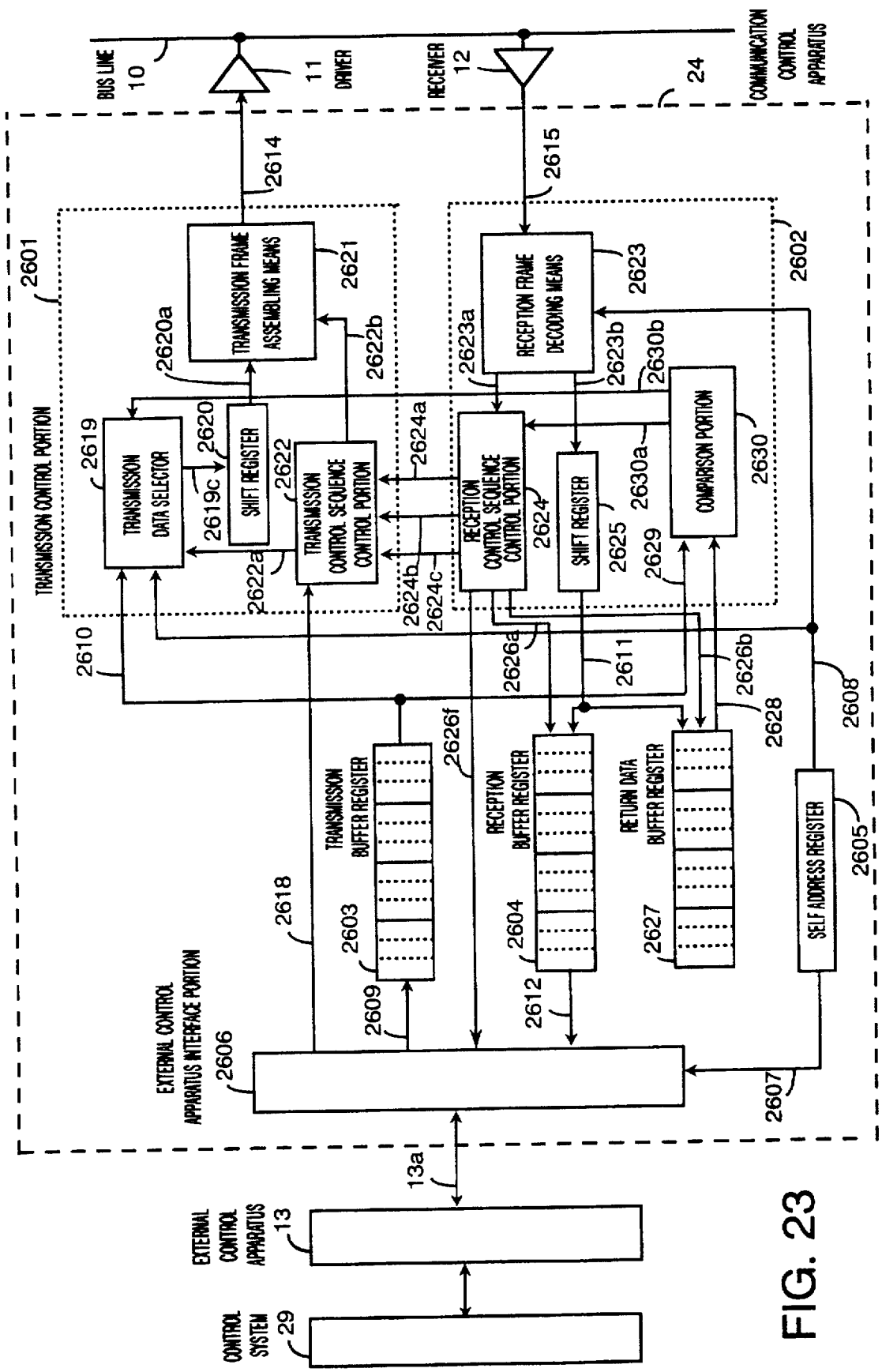
FIG. 23 shows a communication control apparatus 24 of the master node for a seventh embodiment.
Figure 24:
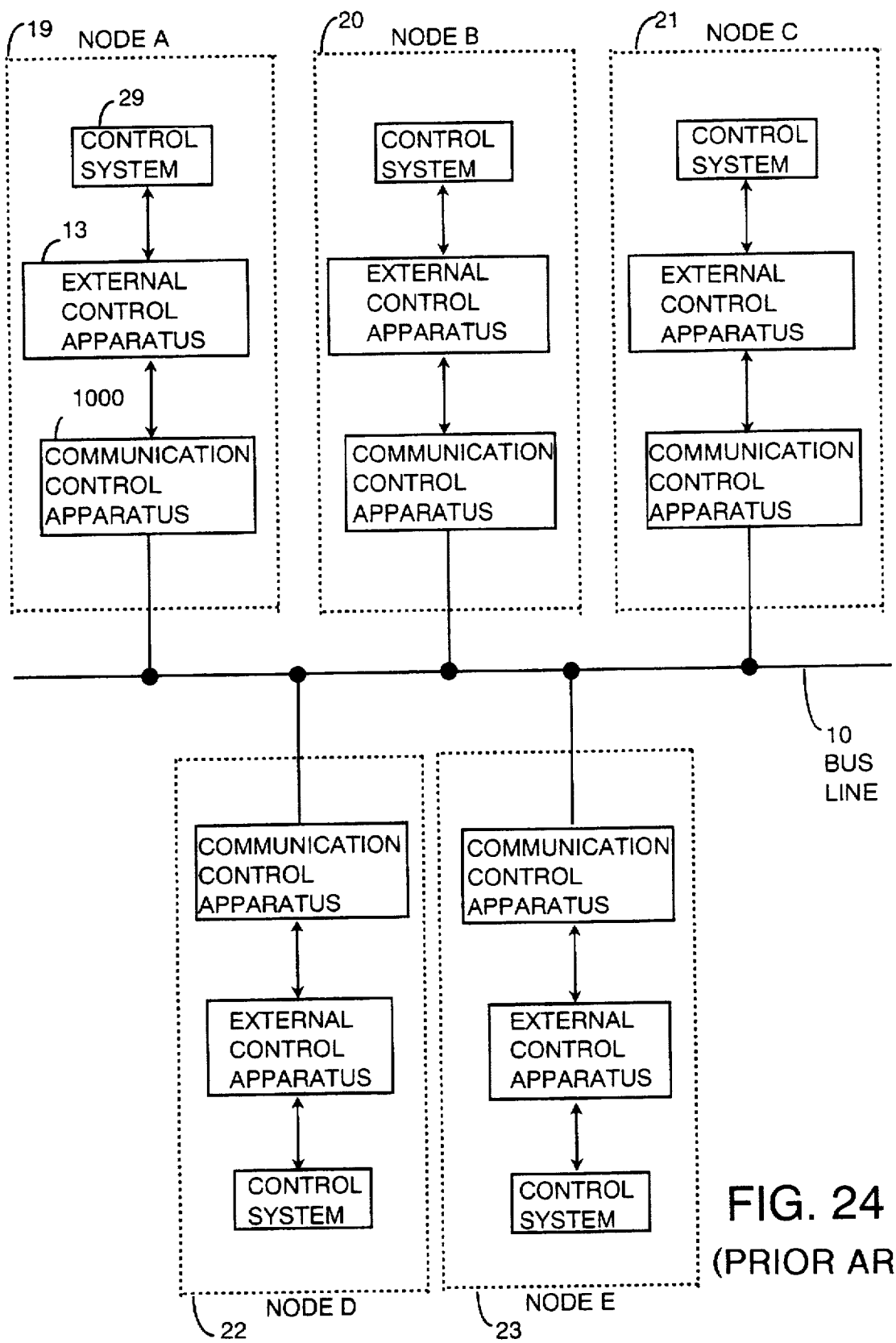
FIG. 24 shows an example of a LAN system using the conventional communication control apparatus.
Figure 25:
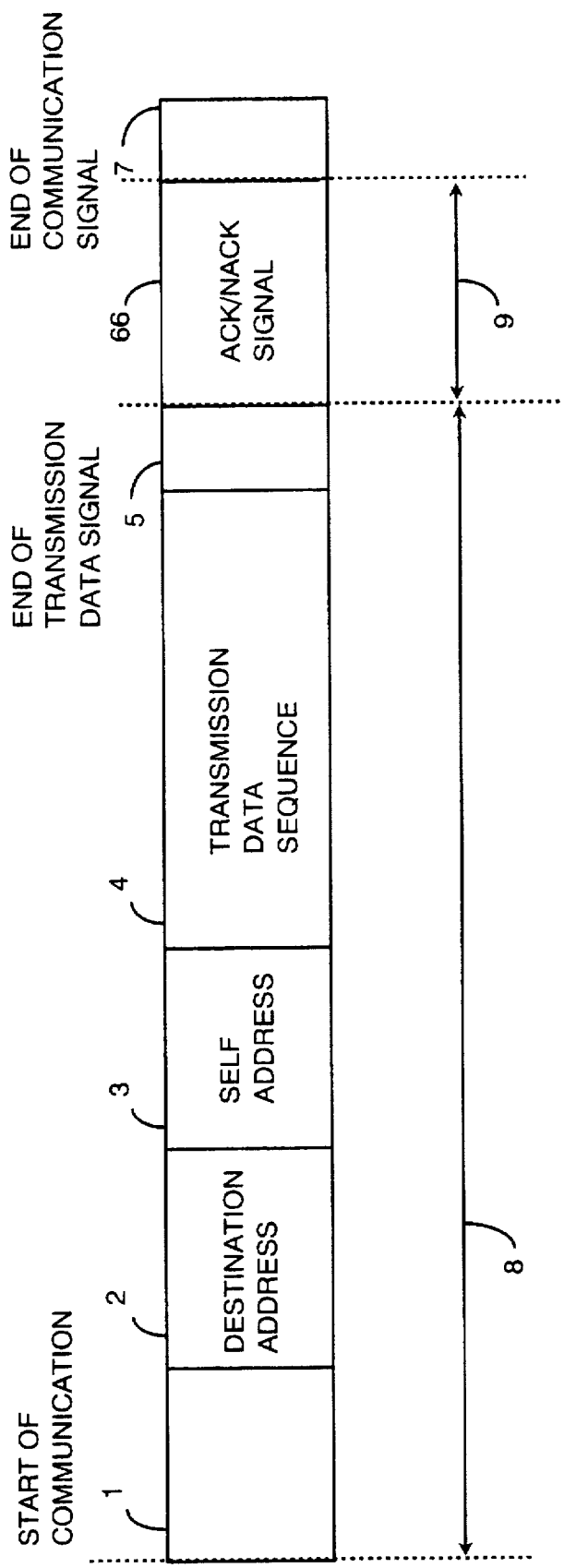
FIG. 25 shows an example of the conventional communication frame format.
Figure 26:
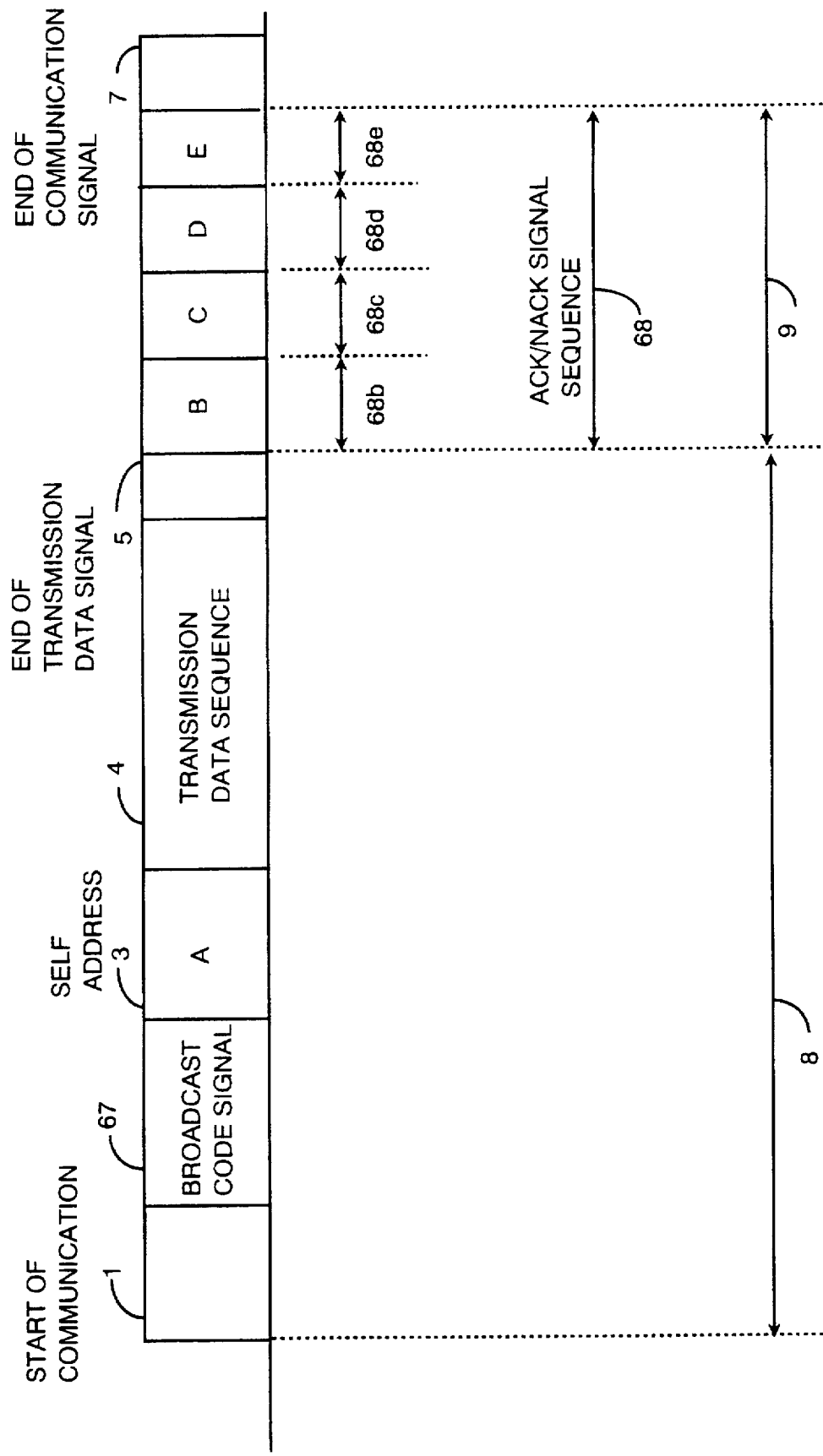
FIG. 26 shows another example of the conventional communication frame format.
Figure 27:
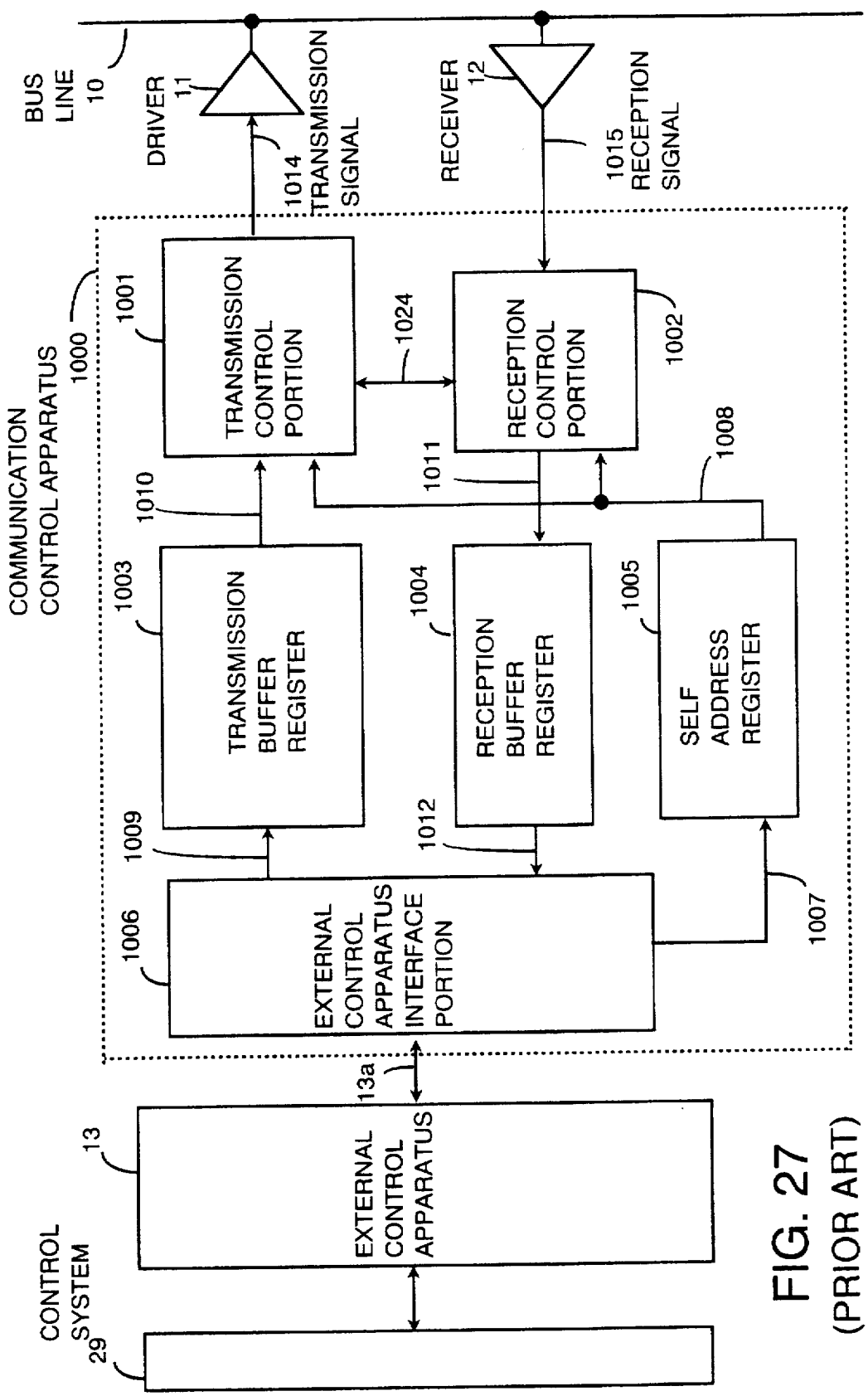
FIG. 27 is a schematic a communication control apparatus 1000 using conventional technique.
Figure 28:
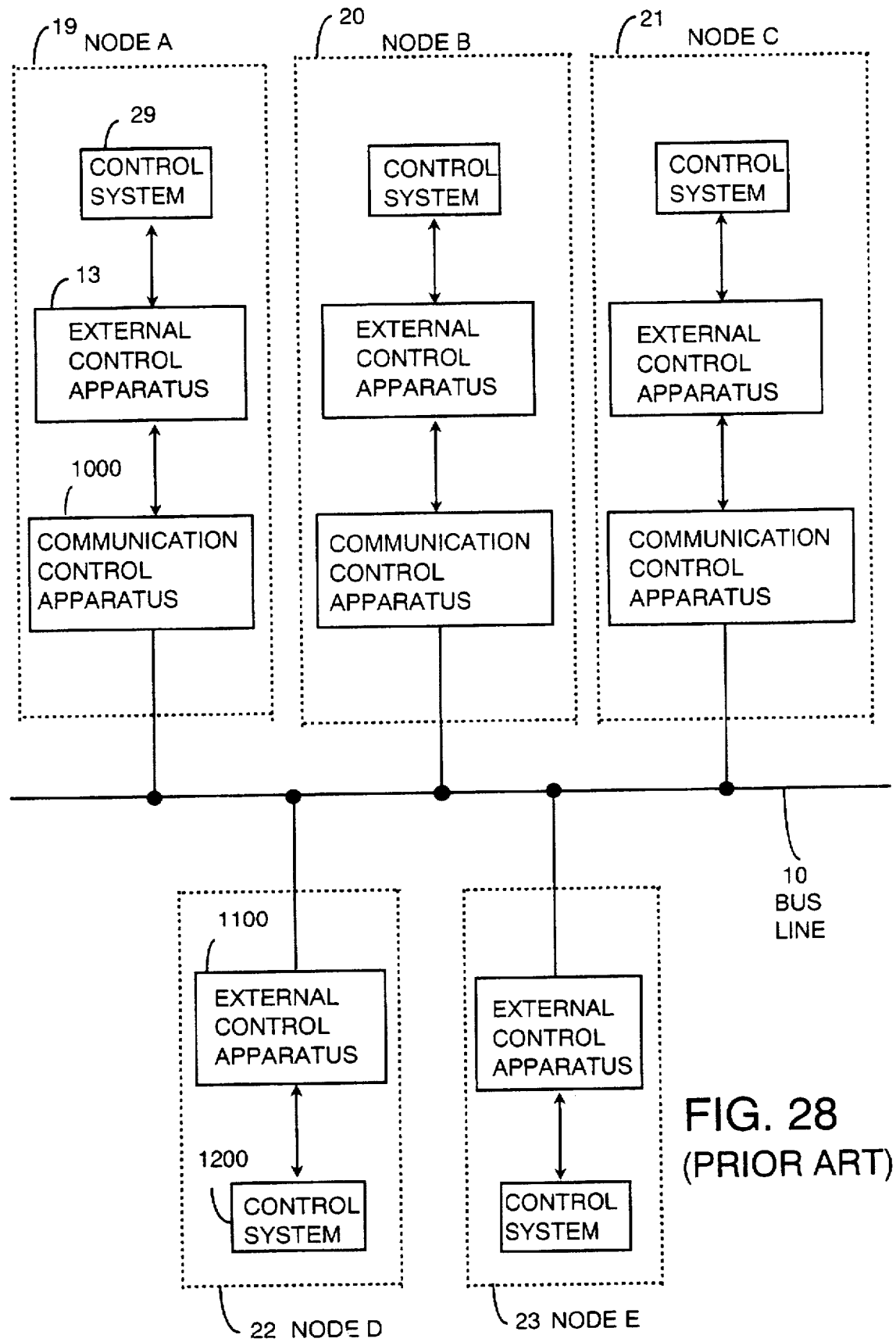
FIG. 28 shows an example of a LAN system using the conventional communication apparatus.
Figure 29:
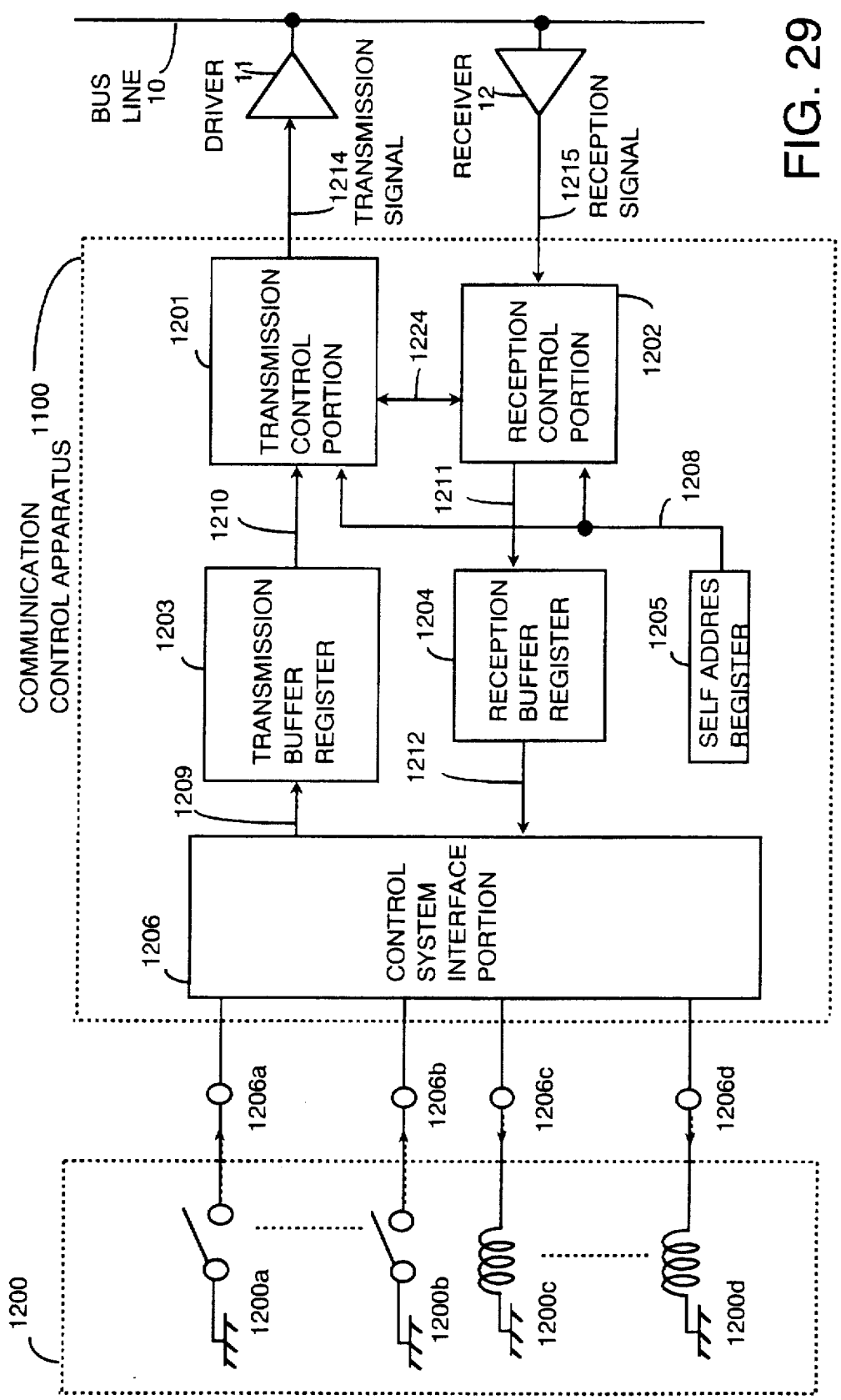
FIG. 29 is a schematic diagram of the communication control apparatus using conventional technique.

An operation of the master node A for receiving transmission signal from slave nodes is explained below using FIG. 23. FIG. 23 shows a construction of communication control apparatus 24 of the master node for a seventh embodiment. In FIG. 23, a reception signal 2615 is inputted into a reception frame decoding means 2623. The master node A receives a transmission data sequence 51 which is transmitted from the slave nodes at the reception frame decoding means 2623. The serial transmission data on a line 2623b which is decoded by the reception frame decoding means 2623 is inputted into a S/P shift register 2625. In case that the reception frame decoding means 2623 detects the code signal 50 which indicates the transmission from slave to master, the reception control portion 2602 starts reception process. The reception data 2611 converted into parallel data are written in a reception data buffer register 2604 according to the reception buffer writing control signal on a line 2626a which is transmitted from the reception control sequence control portion 2624.

After writing all reception data into the reception buffer register 2604, the reception control sequence control portion 2624 transmits the information that no errors are detected to the transmission control sequence control portion 2622 via a line 2624a in case that reception errors are not detected. The transmission control sequence control portion 2622 transmits the control signals to the transmission data selector 2619 and to the transmission frame assembling means 2621 via lines 2622a, 2622b, respectively, and then activates the returning of the acknowledge signal. In this example, acknowledge signals b0, b1, b2, b3 are transmitted to nodes B, C, D, E, respectively. In the present embodiment, acknowledge signal 52 becomes "1111", since the acknowledge signal is logical "1" in case that no reception errors are detected.

The information that no errors are detected is transmitted to an external control apparatus interface portion 2606 via a line 2626f. The external control apparatus interface portion 2606 transmits the reception data stored in the external control apparatus interface portion 2606 to an external control apparatus 13 via a line 13a.

When detecting no errors in the received data, the master node A returns an acknowledge signal only to the node which has transmitted the switch change. Areas b0, b1, b2, b3 of the acknowledge signal 52 in FIG. 20 correspond to nodes B, C, D, E, respectively. The master node A detects state change of the switch, for example, of the slave node C according to the transmission data sequence, and returns acknowledge signal 52 to the slave node. In this case, the acknowledge signal becomes "0100".

In the seventh embodiment, it is explained that the slave node is assembled from the transmission data in the transmission buffer register. But it is possible to assemble the transmission data from the data in the transmission buffer register and the reception buffer register. In this case, the same effect can be obtained.

It is also possible to return both the reception data and the self address data as the return data sequence for the first embodiment to the sixth embodiment. In these cases, the same effect can be obtained.

What is claimed is:

1. A communication control method in which a plurality of nodes, each node having a communication control apparatus, are connected to a bus line, and data is transmitted and received between respective communication control apparatus, the method comprising:

transmitting a communication frame including a transmission data sequence from a first node to a second node;

decoding the communication frame in the second node and storing the transmission data sequence;

analyzing the transmission data sequence in the second node for errors; and returning the transmission data sequence intact as a return data sequence to the first node when no errors are found in the transmission data sequence.

2. A communication control method in which a plurality of nodes, each node having a communication control apparatus, are connected to a bus line, and data is transmitted and received between respective communication control apparatus, the method comprising:

transmitting a communication frame comprising a transmission data sequence from a first node to a second node;

decoding the communication frame in the second node;

storing the transmission data sequence in the second node;

analyzing the transmission data sequence in the second node for errors;

returning the transmission data sequence intact to the first node as a return data sequence if no errors are detected in the transmission data sequence in the second node;

comparing the return data sequence with the transmission data sequence in the first node and producing a comparison result; and transmitting an acknowledge signal from the first node to the second node when the comparison result indicates a match wherein; upon reception of the acknowledge signal, the second node processes the transmission data sequence as effective data.

3. A communication control method in which a master node having a control system and a communication control apparatus, and a plurality of slave nodes, each slave node having a communication control apparatus, are connected to a bus line, and data is transmitted and received between the master node and the slave nodes, the method comprising:

transmitting a communication frame from the master node to the slave nodes, the communication frame comprising a transmission data sequence, the transmission data sequence having a plurality of data portions in data areas corresponding to respective slave nodes;

receiving and decoding the transmitted communication frame in one of the slave nodes;

storing only a data portion of the transmission data sequence that corresponds to the one slave node;

analyzing the data portion in the one slave node for errors;

returning the data portion intact to the master node as a return data sequence;

comparing the return data sequence with the data portion corresponding to the one slave node in transmission data sequence transmitted by the master node and producing a comparison result;

transmitting a transmission node acknowledge signal from the master node to the one slave node if the comparison result indicates a match;

processing the data portion stored in the one slave node as effective data in response to the transmission node acknowledge signal; and processing the data portion stored in the one slave node as non-effective data in the absence of the transmission node acknowledge signal.

4. The communication control method of claim 3, further comprising:

returning data from the plurality of slave nodes to the master node if errors are detected in respective slave nodes in data portions corresponding to the respective slave nodes in the communication frame, the data returned being inverted from the data portions corresponding to respective slave nodes.

5. The communication control method of claim 3, further comprising:

setting an identification bit in an identification area assigned to the one slave node in a reception buffer register in the one slave node, the reception buffer register having a plurality of identification areas for indicating whether reception errors are detected in data portions corresponding to the one slave node; and returning the data portion and the identification bit corresponding to the one slave node to the master node as a return data sequence when an error is detected in the data portion corresponding to the one slave node.

6. A communication control method in which a master node having a control system and a communication control apparatus, and a plurality of slave nodes, each slave node having a communication control apparatus, are connected to a bus line, and data is transmitted and received between the master node and the slave nodes, the method comprising:

transmitting a communication frame from the master node to at least one of the slave nodes, the communication frame including a transmission data sequence having a plurality of data portions and effective/noneffective portions in areas corresponding to respective slave nodes, the effective/non-effective portions indicating whether corresponding data portions are effective; and decoding the communication frame transmitted by the master node in at least one of the slave nodes;

storing only a data portion and an effective/non-effective portion corresponding to a slave node in that slave node as reception data;

checking the data portion stored in the slave node for errors;

returning the data portion and the effective/non-effective portion to the master node as a return data sequence if there are no errors in the data portion;

comparing the return data sequence with the data portion and the effective/non-effective portion corresponding to the slave node in the transmission data sequence and producing a comparison result;

transmitting a transmission node acknowledge signal from the master node to the slave node if the comparison result indicates a match;

processing the reception data in the slave node as effective if the effective/noneffective portion of the reception data indicates that the data portion is effective and processing the data portion as non-effective if the effective/non-effective portion indicates that the data portion is non-effective.

7. The communication control method of claim 6, comprising:

inverting the data portion if the slave node detects an error in the data portion to produce an inverted data portion; and returning the inverted data portion to the master node.

8. The communication control method of claim 6, further comprising:

setting an identification bit in an identification area assigned to the slave node in a reception buffer register in the slave node, the reception buffer register having a plurality of identification areas for indicating whether the reception errors are detected in data portions corresponding to the slave node; and returning the data portion and the identification bit corresponding to the slave node to the master node as a return data sequence when an error is detected in the data portion corresponding to the slave node.

9. A communication apparatus comprising:

a bus line;

a plurality of communication control apparatus connected to the bus line, data being transmitted and received between respective communication control apparatus through the bus line, the communication apparatus comprising:

a transmitting node including:

a transmission buffer register for storing a transmission data sequence, a transmission control portion for assembling the transmission data sequence stored in the transmission buffer into a communication frame and transmitting the communication frame including the transmission data sequence; and receiving nodes, each receiving node including:
- a reception control portion for receiving and decoding the communication frame to determine whether an error is present in the transmission data sequence,
- a reception buffer register for storing the transmission data sequence decoded in the reception control portion and a transmission control portion for returning the transmission data sequence stored in the reception buffer register intact to the transmitting node as a return data sequence when no error is detected in the transmission data sequence received by the reception control portion.

10. A communication apparatus comprising:

a bus line;

a plurality of communication control apparatus connected to the bus line, data being transmitted and received between respective communication control apparatus through the bus line, the communication apparatus comprising:

a transmitting node including:
- a transmission buffer register for storing a transmission data sequence,
- a return data sequence buffer for storing a return data sequence received from a receiving node,
- comparison means for comparing contents of the transmission buffer register with contents of the return data sequence buffer and producing a comparison result, and
- a transmission control portion for assembling the transmission buffer data sequence stored in the transmission buffer into a communication frame including the transmission data sequence and transmitting the communication frame to a receiving node, and, if the comparison result indicates a match, returning a transmission node acknowledge signal to the receiving node; and receiving nodes, each receiving node including:
- a reception control portion for decoding a received communication frame for determining whether an error is present in the transmission data sequence, and for processing the transmission data sequence as effective data upon receiving a transmission node acknowledge signal from the transmitting node,
- a reception buffer register for storing the transmission data sequence decoded by the reception control portion, and
- a transmission control portion for returning the transmission data sequence stored in the reception buffer register intact to the transmitting node as a return data sequence when no error is detected in the transmission data sequence received by the reception control portion.

11. A communication apparatus comprising:

a bus line;

a master node connected to the bus line and having a control system and a communication control apparatus, and a plurality of slave nodes, each slave node having a communication control apparatus and being connected to the bus line, data transmitted from the master node including a priority bit and a non-priority bit, wherein if data conflict with each other, the data are transmitted and received between the master node and the slave nodes by sending a priority bit to the bus line, wherein:

the master node includes:
- a transmission buffer register for storing a transmission data sequence to be transmitted to the slave nodes,
- a return data sequence buffer for storing return data sequences received from the slave nodes,
- comparison means for comparing contents of the transmission buffer register with contents of the return data sequence buffer and producing a comparison result, and
- a transmission control portion for assembling the transmission data sequence into a communication frame including a plurality of data portions in a plurality of data areas, each data area corresponding to one of the slave nodes, and, when the comparison result indicates a match, returning transmission node acknowledge signals to the slave nodes; and each of the slave nodes includes:
- a reception control portion for decoding the communication frame to determine whether an error is present in a data portion corresponding to a slave node, and for processing a data portion corresponding to the slave node as effective data upon receiving the transmission node acknowledge signal from the master node;
- a reception buffer register for storing the data portion corresponding to the slave node and for inserting non-priority bits in data areas, corresponding to other slave nodes; and
- a transmission control portion for returning the data portion stored in the reception buffer register intact to the master node as a return data sequence when no error is present in the data portion corresponding to the slave node.

12. The communication apparatus of claim 11 wherein the slave node resets data portions in the reception buffer register in areas corresponding to other slave nodes.

13. The communication apparatus of claim 11 wherein the transmission data sequence stored in the reception buffer register comprises an identification area indicating whether a reception error is present in the data portions corresponding to respective slave nodes, and the slave node, determining that no error is present in the data portion corresponding to the slave node, sets an identification bit in an identification area corresponding to the slave node in the reception buffer register.

14. A communication apparatus comprising:

a bus line;

a master node connected to the bus line and having a control system and a communication control apparatus; and a plurality of slave nodes, each slave node having a communication control apparatus and connected to the bus line, and data transmitted from the master node including a priority bit and a non-priority bit, wherein if data conflict with each other, the data are transmitted and received between the master node and the slave nodes by sending a priority bit to the bus line wherein:

the master node includes:

a transmission buffer register for storing a transmission data sequence to be transmitted to the slave nodes;

a return data sequence buffer for storing a return data sequence having a plurality of data portions and effective/non-effective portions in areas corresponding to each slave node, received from the slave nodes;

comparison means for comparing contents of the transmission buffer register with contents of the return data sequence buffer and producing a comparison result;

a transmission control portion for assembling the transmission data sequence, including the plurality of data portions and the effective/non-effective portions, into a communication frame including areas corresponding to each slave node, and, if the comparison result indicates a match, returning transmission node acknowledge signals to the slave nodes in areas corresponding to the slave nodes;

each of the slave nodes includes:

a reception control portion for decoding the communication frame to determine whether an error is present in a data portion corresponding to a slave node, and for processing a data portion corresponding to the slave node as effective data upon receiving the transmission node acknowledge signal from the master node, and processing the data portion corresponding to the slave node as non-effective data when the effective/non-effective portion indicates the data portion to be non-effective;

a reception buffer register for storing the data portion and the effective/non-effective portion in corresponding to the slave node, for storing data portions corresponding to other slave nodes, and adding a non-priority bit to the data portions corresponding to the other slave nodes;

a transmission control portion for returning the data portion corresponding to the slave node stored in the reception buffer register intact to the master node as the return data sequence when no error is present in the data portion corresponding to the slave node.

15. The communication apparatus of claim 14 wherein the first slave node resets data portions in the reception buffer register corresponding to the other slave nodes.

16. The communication apparatus of claim 14 wherein the transmission data sequence stored in the reception buffer register comprises an identification area, indicating whether reception errors are detected in the data portions corresponding to respective slave nodes, and the slave node, when determining that no error is present in the data portion corresponding to the slave node, sets an identification bit in the identification area corresponding to the slave node in the reception buffer register.

* * * * *

UNITED STATES PATENT AND TRADEMARK OFFICE
CERTIFICATE OF CORRECTION

PATENT NO.   : 5,754,531
DATED        : May 19, 1998
INVENTOR(S)  : Okamoto

It is certified that error appears in the above-identified patent and that said Letters Patent is hereby corrected as shown below:

Item 30, (Foreign Application Priority Data), change

"June 15, 1992" to --June 15, 1995--.

Signed and Sealed this

Twentieth Day of October, 1998

Attest:

BRUCE LEHMAN

Attesting Officer         Commissioner of Patents and Trademarks